(12) United States Patent
Marquez et al.

(10) Patent No.: US 12,445,417 B2
(45) Date of Patent: Oct. 14, 2025

(54) SYSTEM AND METHOD TO COMMUNICATE USING A SECURE OBFUSCATED NETWORK

(71) Applicant: Northrop Grumman Systems Corporation, Falls Church, VA (US)

(72) Inventors: Marlon E. Marquez, Redondo Beach, CA (US); Darren R. Gregoire, Redondo Beach, CA (US); Prakash Sarathy, Redondo Beach, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 224 days.

(21) Appl. No.: 18/220,452

(22) Filed: Jul. 11, 2023

(65) Prior Publication Data
US 2025/0023849 A1    Jan. 16, 2025

(51) Int. Cl.
*H04L 9/40* (2022.01)
*H04L 12/22* (2006.01)

(52) U.S. Cl.
CPC .......... *H04L 63/0428* (2013.01); *H04L 12/22* (2013.01)

(58) Field of Classification Search
CPC ....................................................... H04L 12/22
See application file for complete search history.

(56) References Cited

U.S. PATENT DOCUMENTS

| 2005/0094640 | A1 | 5/2005 | Howe |
| 2012/0207139 | A1* | 8/2012 | Husted ................ H04L 69/08 370/328 |
| 2018/0241760 | A1 | 8/2018 | Stephens |

OTHER PUBLICATIONS

International Search Report and Written Opinion of the International Searching Authority issued in connection with PCT Patent Application No. PCT/US2024/035348, dated Apr. 22, 2025, 10 pages.

\* cited by examiner

*Primary Examiner* — Esther B. Henderson
(74) *Attorney, Agent, or Firm* — KLINTWORTH & ROZENBLAT LLP

(57) ABSTRACT

A dual-mode communication device adapted for communication over a public network, wherein the dual-mode communication device is adapted to be operated in a normal mode and in an obfuscated mode. The dual-mode communication device includes a processor and a network interface device. The processor develops a frame from a payload received by the dual-communication device and, if the dual-mode communication device is operating in the obfuscated mode, an obfuscated frame from the frame. The frame and the obfuscated frame comprise a preamble that conforms with protocols associated with the public network and the processor. A network interface transmits one of the frame or the obfuscated frame using the public network. The payload may be extracted from the frame by any receiving device operating in the normal mode in the public network and the payload may be extracted from the obfuscated frame only by another communication device also operating in the obfuscated mode in the public network.

21 Claims, 14 Drawing Sheets

| Time | Encryption | Permutation |
|------|------------|-------------|
| 00:00:00 | N | 512-536, 128-256, 1-32, ... |
| 00:00:15 | N | 1-32, 128-256, 512-1024, ... |
| 00:00:30 | Key-1 | 1-32, 33-64, 256-512, ... |
| 00:00:45 | Key-20 | 256-288, 128-255, 32-64, ... |
| ... | ... | ... |
| 11:59:45 | N | 1-32, 128-256, 33-64, ... |

FIG. 6

SYSTEM AND METHOD TO COMMUNICATE USING A SECURE OBFUSCATED NETWORK

FIELD OF DISCLOSURE

The present subject matter relates to systems and methods for network communications, and more particularly, system and methods that enable communications over secure obfuscated network.

BACKGROUND

The Open Systems Interconnection model ("OSI model") is a conceptual model that provides coordination of standards developed for communications between devices. The OSI model separates communication between devices into seven abstraction layers. The IEEE 802.3 Ethernet standard defines implementation of the physical and data link layers corresponding to layers 1 and 2 of the OSI model and the Internet Protocol ("IP") as specified in DARPA, "Internet Protocol Specification, RFC 791" (herein after "RFC 791"), defines the network layer corresponding to layer 3 of the OSI model to implement the Ethernet/IP based communications, as used by the Internet. In particular, these standards and specifications define the syntactic, semantic, and logical rules of the facilitate communications between a first application operating on a first computer and a second application operating on the second computer operating in a local area network or in separate first and second local area networks, respectively, that form a wide area network. Some wide area networks are public networks, for example, the Internet, and access to such public networks is provided to the general public with few access rules and restrictions. Typically, the general public may use commercially available equipment (modems, routers, etc.) to connect a device for communications over the public network.

Typically, the first application develops a payload (i.e., bytes of user data) to be transmitted to the second application. A network interface of the first computer packetizes the message payload into one or more packets and adds header information to each packet to create an IP packet. Additional header information is added to the IP packet to create an Ethernet frame that is transmitted over a transmission link. If the transmission link is an Ethernet connection, then the packet is encoded in accordance with the IP protocols and the network interface generates an Ethernet frame that is transmitted over the Ethernet connection.

It should be apparent to one of ordinary skill in the art that each computer and communication device (or the network interface thereof) operating in a network in accordance with Ethernet protocols determines a destination Ethernet media access control ("MAC") address of another device in the network to which an Ethernet frame is to be transmitted and encodes such destination MAC address in the Ethernet frame generated thereby. Such destination Ethernet MAC address may be determined, for example, by using an address resolution protocol ("ARP") in accordance with the Ethernet protocol.

The header information added to the payload to create the Ethernet frame includes a first IP address of the first computer, a first port number of the first computer the first application is using to send the payload, a second IP address of the second computer, a second port number of the second computer on which the second application is listening for a payload to arrive, a checksum of the payload that can be used to verify correctness of the packet received at the second computer, and the like.

The syntactic rules specified in RFC 791 specify the bit locations of certain fields within the header where certain information (e.g., first IP address, second IP address, etc.) may be found. The semantic rules specify the meaning of the information in a field of the header and how to such information is encoded (e.g., which bits of the field are most significant and which one are least significant, etc.). Logical rules specify permitted values for fields of syntactically and semantically correct packets, how checksums are to be treated, and the like.

The network interface transmits each Ethernet frame to a first communication device (e.g., a router or a switch) of the first local area network. The first communication device determines if the second IP address is associated with a second computer that is also operating in the first local area network. If so, the first communication device transmits the packet to a network interface of the second computer.

Otherwise, the first communication device transmits the packet to a further communication device of the wide area network. The further communication device determines if the second IP address is associated with a computer operating in a local area network associated with the further communication device, and if so, transmits the packet to such computer. Otherwise, the further communication device transmits the packet to a still further communication device.

Packets are transmitted from communication device to communication device in this manner until the packet is delivered to the second computer or, in some cases, the packet has passed through a predetermined number of communication devices without delivery and is discarded.

Because the syntactic, semantic, and logical rules of how a payload is packetized into frames and transmitted are publicly known, adversaries may leverage such knowledge to attack the first and second computers and/or the first and second communication devices, even if the payloads being transmitted therebetween is encrypted.

For example, an adversary may undertake a Distributed Denial of Service (DDOS) attack in which the adversary obtains the IP address of a target computer from a packet transmitted thereby and then generates and sends to the target computer many (on the order of tens of millions) of syntactically, semantically, and logically correct Ethernet frames to the target computer in an attempt to overwhelm the computing and processing resources thereof and thereby causes responsiveness of the target computer to deteriorate or even a shutdown of the target computer. Similarly, an adversary may undertake a replay attack in which the adversary repeatedly transmits one or more syntactically, semantically, and logically correct Ethernet frames to the target computer to degrade performance thereof.

In other types of attacks, such as Internet service hijacking, the adversary may generate and send to a target network syntactically, semantically, and logically correct Ethernet frames to register the adversary's network as a domain name server and/or provide routing services using a border gateway protocol or an open shortest path first (OSPF) protocol and thereby divert Ethernet frames sent from the target network to the adversary's own network. Other types of attacks made possible by public knowledge of the syntactic, semantic, and logical rules of the Internet and Ethernet protocols include confidentiality attacks in which encrypted data in encoded in a Ethernet frame sent by a target computer is intercepted and decoded with publicly available key exchange algorithms or artificial integrity attacks in which systematic semantic rules of a protocol used to encode payloads in an Ethernet frame is reverse engineered using machine learning.

As noted above, the open nature of the Internet allows syntactic, semantic, and logical rules information to be available to adversaries, who can attempt to leverage such information to identify vulnerabilities of a target computer to degrade the performance thereof or to exfiltrate data sent by the target computer.

The Global Positioning System (GPS) obviates the above noted issues by operating in a commercial mode during peacetime and in a military mode during period of conflict. When operating in the commercial mode, the satellites associated with the GPS transmit geolocation and time information to a GPS receiver using frames whose syntactic, semantic, and logical rules are publicly known. However, when switched to the military mode, the satellites transmit geolocation and time information using packets and frames having syntactic, semantic, and logical rules that are known only to the United State military. Thus, during periods of conflict, geolocation and time information generated by the GPS cannot be used by non-US military devices and in particular adversaries. However, the Global Positioning System is not a general purpose communication system that allows for bidirectional communications between general purpose computing systems.

Communications systems that completely hide syntactic, semantic, and logical rules from adversaries may be used to allow communications between computing systems while minimizing the risk of the threats from adversaries noted above. One such system is the MADL/Link 16 military data link used by NATO and other authorized nations for communications to allow military aircraft, ships, and ground forces to exchange tactical information. Although, unlike GPS, such communications systems allow bidirectional communications between computing systems, these communication systems do not operate using commercially available equipment in accordance with protocols of a public network and that specify physical, data link layer, and network layers in accordance with, for example, the Ethernet standard and the IP protocol. Further, these systems require specially configured hardware/software that is not commercially available.

Computing devices may use encryption to obfuscate data being transmitted therebetween and while such encryption may be effective in preventing eavesdropping, if the data is transmitted using industry standard Ethernet and IP protocols, such computing devices may still be vulnerable to the distributed denial of service, vector replay, data analytics based attacks noted above.

SUMMARY

According to one aspect, a dual-mode communication device is adapted for communication over a public network and to be operated in a normal mode and in an obfuscated mode. The dual mode-communication device includes a processor that develops a frame from a payload and, if the dual-mode communication device is operating in the obfuscated mode, an obfuscated frame from the frame, wherein the frame and the obfuscated frame comprise a preamble that conforms with protocols associated with the public network and the processor. The dual-mode communication device also comprises a network interface that transmits one of the frame or the obfuscated frame using the public network. The payload may be extracted from the frame by any receiving device operating in the normal mode in the public network and the payload may be extracted from the obfuscated frame only by another communication device also operating in the obfuscated mode in the public network.

According to another aspect, a dual-mode communication device is adapted for communication over a public network, wherein the dual-mode communication device is adapted to be operated in a normal mode and in an obfuscated mode, the dual mode-communication device includes a network interface that receives a frame from the public network. The frame comprises a preamble and a frame check sequence that conform with protocols associated with the public network. The dual-mode communication device also includes a processor that develops a payload from the frame without de-permuting the frame if the dual-mode communication device is operating normal mode and the processor de-permutes the frame to develop the payload if the dual-mode communication device is operating in the obfuscated mode.

According to yet another aspect, a method of operating a dual-mode communication device operable in a normal mode and an obfuscated mode for communication over a public network includes the steps of receiving a payload to be transmitted over the public network and developing a frame from the payload. The method further includes developing an obfuscated frame from the frame if the dual-mode communication device is operating in the obfuscated mode. The frame and the obfuscated frame comprise a preamble that conforms with protocols associated with the public network and the processor. In addition, the method includes directing a network interface to transmit one of the frame or the obfuscated frame using the public network. The payload may be extracted from the frame by any receiving device operating in a normal mode in the public network and the payload may be extracted from the obfuscated frame only by another communication device also operating in an obfuscated mode in the public network.

Other aspects and advantages will become apparent upon consideration of the following detailed description and the attached drawings wherein like numerals designate like structures throughout the specification.

BRIEF DESCRIPTION OF THE DRAWINGS

FIG. 6 is a table that shows a scheme used by the dual-mode communication devices of FIG. 1 to generate an obfuscated Ethernet frame from an Ethernet frame;

DETAILED DESCRIPTION

A dual-mode communications device in accordance with the present application operates in a normal mode and an obfuscated mode. When operating in the normal mode, a first communication device receives a data packet from a first computing device and transmits the data packet to a second communication device in accordance with publicly known syntactic, semantic, and logical rules in accordance with the IP and Ethernet protocols. Upon receipt of a directive, the first and second dual-mode communication devices are switched to operate in an obfuscated mode.

In the obfuscated mode, the first dual-mode communication device permutes and otherwise obfuscates Ethernet frames in a manner that deviates from the publicly known syntactic, semantic, and logical rules associated with the IP and Ethernet protocols.

If a payload generated by a first computer is transmitted using the first communication device operating in the obfuscated mode, the first communication device embeds the payload in an obfuscated data Ethernet frame transmits the obfuscated Ethernet frame to the second dual-mode communication device (also operating in the obfuscated mode). In some embodiments, a network interface of the first computer or the first communication device may divide the payload generated by the first computer into one or more smaller payloads and transmit such smaller payload in an Ethernet frame or obfuscated Ethernet frame. The second dual-mode communication device analyzes the obfuscated data Ethernet frame to extract the payload and transmits the payload to the second computing. Note that a first application operating on the first computing device that the payload and the second application operating on the second computing device that received such payload operate identically regardless of whether the first and second communication devices are operating in the normal mode or in the obfuscated mode.

In the example described above, if the obfuscated Ethernet frame generated by the first communication device is received by a third communication device that is not operating in the obfuscated mode, the third communication device interprets the obfuscated data packet as not following the syntactic, semantic, and logical rules associated with the IP protocol and discards the obfuscated data packet.

Further, in some embodiments, if the communication device is operating in the obfuscated mode and receives an Ethernet frame that is in accordance with the syntactic, semantic, and logical rules associated with Ethernet and IP protocols (i.e., an Ethernet frame that is not obfuscated), the communication device will discard the received packet. Thus, any DDOS or similar attack Ethernet frames directed at the communication device are discarded and the threat from such attacks is minimized.

Figure 1:
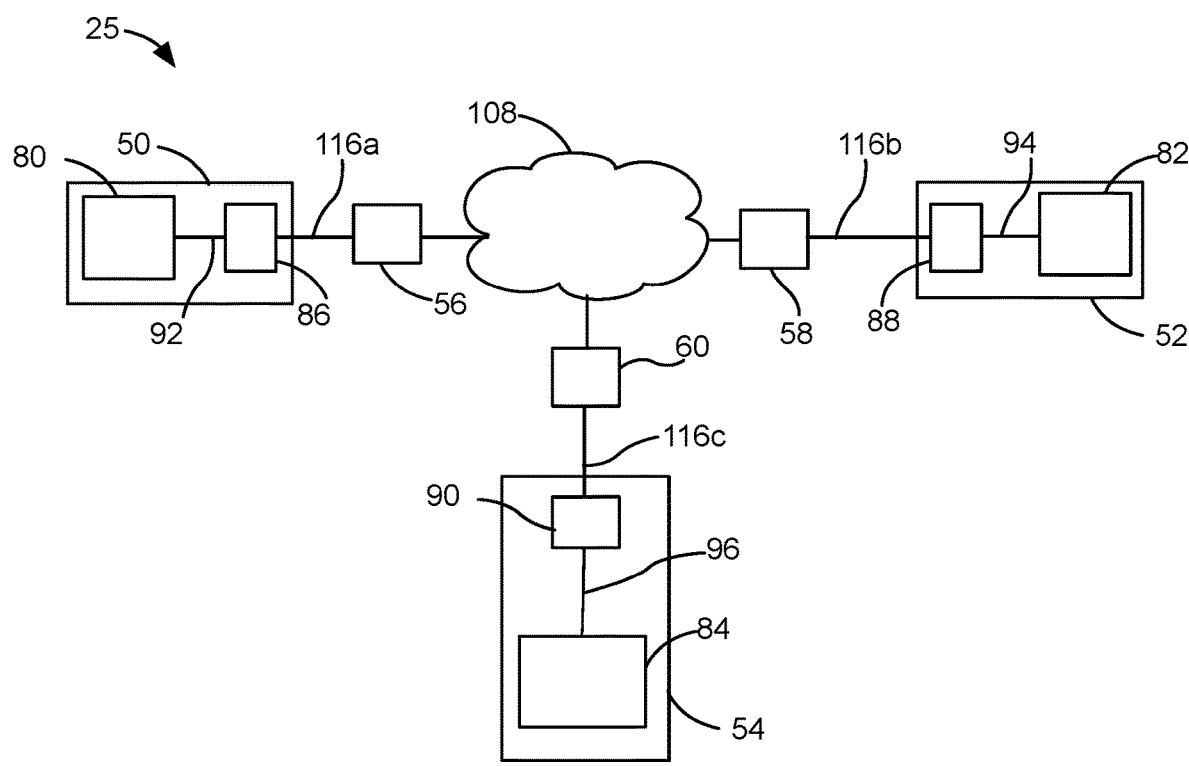
FIG. 1 is a block diagram of a components of a network that includes dual-mode communication devices.

Referring to FIG. 1, an example network 25 comprises a first computer 50, a second computer 52, and a third computer 54 coupled to a first router/modem 56, a second router/modem 58, and third router/modem 60, respectively. The first, second, and third router/modems 56, 58, and 60 couple the first, second, and third computers 50, 52, and 56 to a wide area network 108, preferably a public network (e.g., the Internet). Each of the first, second, and third router/modem 56, 58, and 60 may be an integrated device that includes both a router and a modem or a separate router device coupled to a modem device. Further, each router/modem 56, 58, and 60 may include a network switch that couples the first, second, and third computer 50, 52, 54 coupled thereto to another computer (not shown) on the same network as the first, second, and third computer 50, 52, 54. Further, such switch may be integrated into the router/modem 56, 58, 60 or such switch may be coupled to the router portion of the router/modem 56, 58, 60.

The first, second, and third computers 50,52,54 may be, for example, a personal computer, a server, a handheld computing device, an internet of things device, and the like. Each computer 50, 52, 54 includes at least one processor 80, 82, 84 coupled to a network interface device 86,88,90, respectively. The first, second, and third network interface devices 86,88,90 may be coupled to the processor 80,82,84, via communications link 92,94,96, respectively. As would be apparent to one who has ordinary skill in the art, the communication link 92,94,96 may be a Peripheral Component Interconnect Express (PCIe) bus, (e.g., if the network interface device 86,88,90 is a network adapter card), a Universal Serial Bus (USB) port (e.g., if the network interface device 86,88,90 is a USB network device), Advanced Extensible Interface (AXI), Thunderbolt, and the like.

The first, second, and third network interface devices 86,88,90 are coupled to the first, second, and third router/modems 56,58,60 by transmission links 116a-116c. The transmission links 116a-116c may be any medium suitable for transmission of data in accordance with the IP and Ethernet protocols including, for example, a wired or wireless Ethernet connection, a fiber connection, a telephonic connection, a broadband connection, a satellite connection, and the like.

Figure 2:
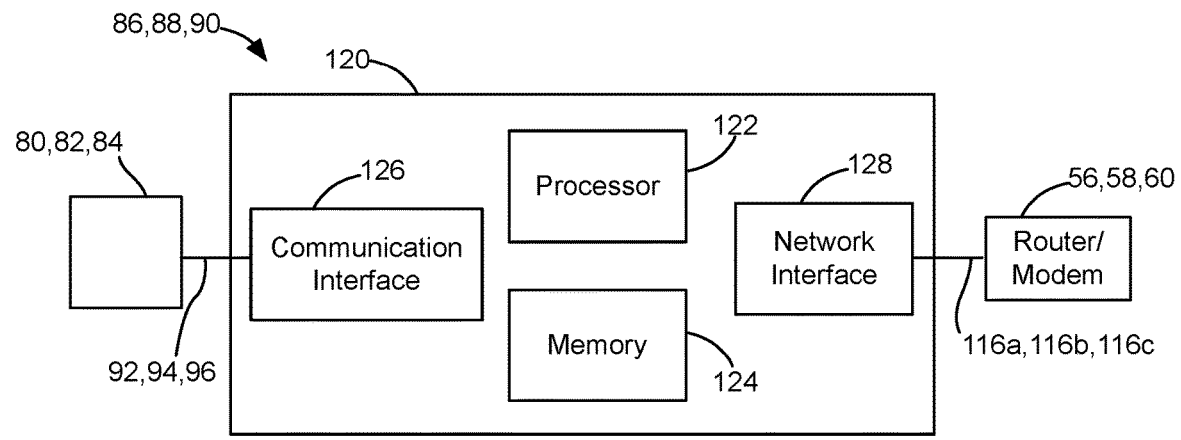
FIG. 2 is a block diagram of an embodiment of the dual mode communication device of FIG. 1 that is a network interface device.

Referring to FIGS. 1 and 2, the first, second, and third network interface devices 86,88,90 may each be implemented by a programmed device 120 having a processor (or multiple processors or processing hardware that does not include a microprocessor such as an FPGA) 122, a memory 124, a communication interface module 126, and a network interface module 128. The communication interface module 126 is coupled to the processor 80,82,84 of the computer 50,52,54, via a communication link 92,94,96, as described above. It should be apparent to one of ordinary skill in the art that one or more of the computers 50,52,54 and one or more of the network interface device(s) 86,88,90 may be implemented using one or more microprocessors, a field programmable gate array (FPGA), an application specific integrated processor, or any other appropriate processing hardware technology.

The memory 124 has stored therein, among other things, programming instructions executed by the processor 122 to receive via the communication interface 126 user data or a payload generated by the processor 80,82,84. The programming instructions in the memory 124, when executed, cause the processor 122 to develop an Ethernet frame and transmit the Ethernet frame to the network interface module 128, which in turn transmits the Ethernet frame to the router/modem 56,58,60 (or other communication device) that couples the network interface device 86,88,90 (and thus the computer 50,52,54) to the wide area network 108.

If the network interface device 86,88,90 is a dual-mode network interface device, the programming instructions cause the processor 122 to determine if the further packet should be obfuscated before being transmitted to the network interface module 128, as described in greater detail below.

Further, the programming instructions cause the processor 122 to receive from the network interface module 128 an Ethernet frame received from the router/modem 56,58,60, determine if the Ethernet frame is intended for a computer 50,52,54 associated therewith, un-obfuscate the received Ethernet frame if necessary, and transmit the Ethernet frame packet or the payload to the processor 80,82,84, respectively. Thus, the processor 80,82,84 only receives un-obfuscated Ethernet frames and/or payload data regardless of whether the network interface device 86,88,90 is operating in the normal mode or obfuscated mode.

Figure 2A:
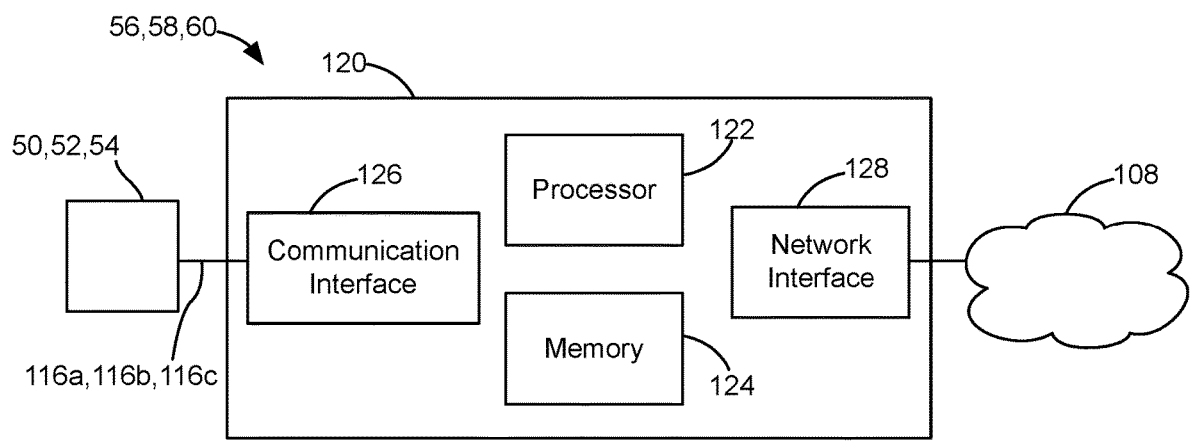
FIG. 2A is a block diagram of an embodiment of the dual mode communication device of FIG. 1 that is a router/modem.

It should be apparent to one who has ordinary skill in the art that like the network interface device 86,88,90, the router/modem 56,58,60 is also a communication device and the router portion of the router/modem 56,58,60 may also operate in a normal mode or an obfuscated mode. Further, referring to FIG. 2A, such router portion of the router/modem 56,58,60 may be implemented using an architecture similar to that shown in FIG. 2 used to implement the network interface device 86,88,90, except the communication interface module 126 is a module that is operable to receive data over the communication link 116a, 116b, 116c and the network interface module 128 is coupled to the wide area network 108 (e.g., via the modem portion of the router/modem 56,58,60).

Thus, the programming instructions stored in the memory 124 of the cause the processor 122 of the router/modem 56,58,60 to receive from the network interface module 128 an Ethernet frame received from the wide area network 108, un-obfuscate the received Ethernet frame if necessary, determine if the Ethernet frame is intended for a computer 50,52,54 operating on the local area network managed by the router/modem 56,58,60, respectively, and if so generate and transmit a further Ethernet frame packet to such computer. Otherwise, the programming instructions cause the processor 122 of the router/modem 56,58,60 to transmit the Ethernet frame to another communication device on the wide area network 108 via the network interface module 128 as described above.

Figure 3:
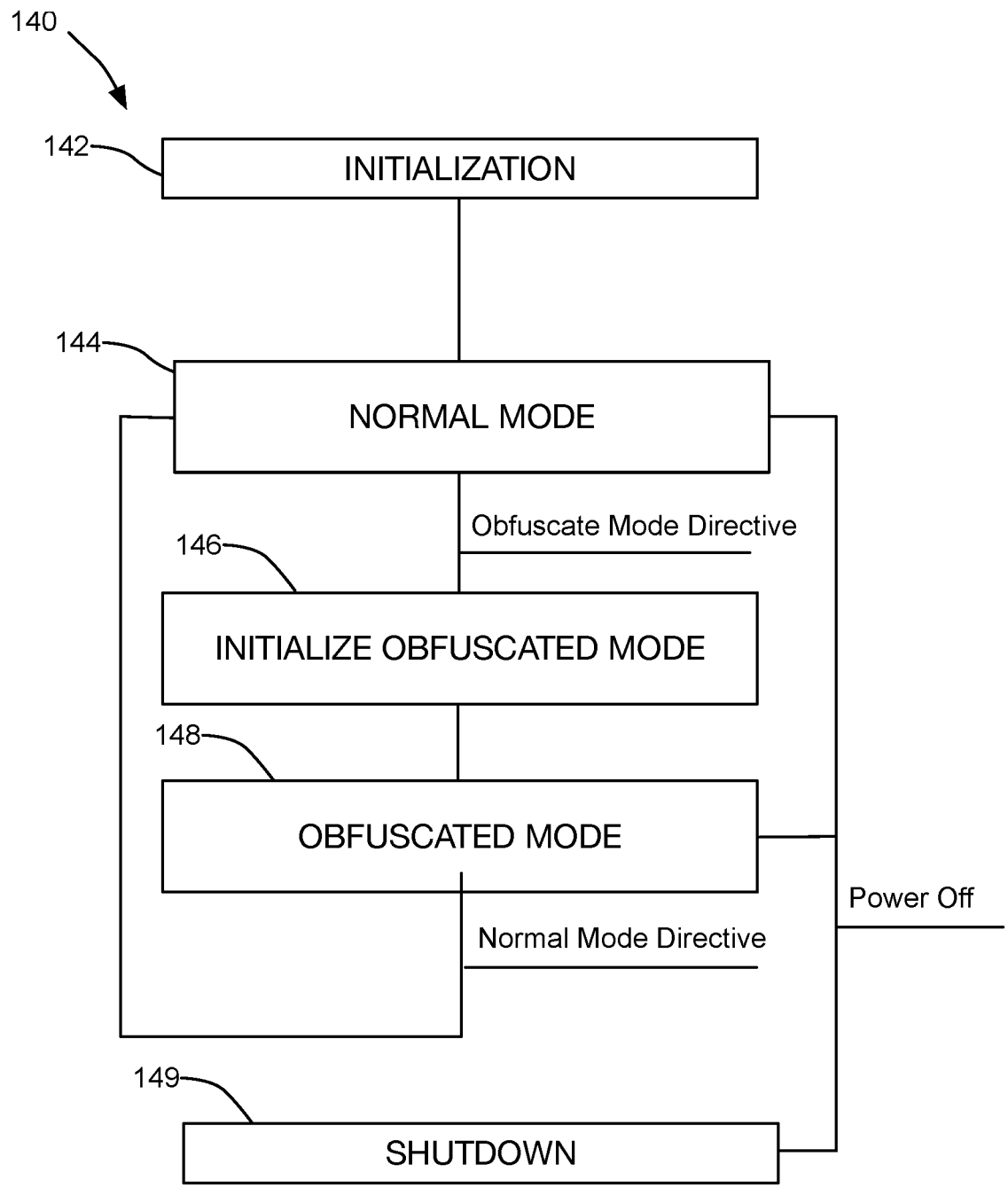
FIG. 3 is a state transition diagram of the operation of the dual-mode communication devices of FIG. 1.

FIG. 3 is a state diagram 140 of the operation of a dual-mode network interface device 86,88,90. It should be apparent to one who has ordinary skill in the art that the operation of the operation of the dual-mode network interface device 86,88,90 described herein may be adapted to operate the dual-mode router/modem 56,58,60.

Referring to FIGS. 2 and 3, when the dual-mode network interface device 86,88,90 is powered on, the dual-mode network interface device 86,88,90 enters an initialization state 142 in which the processor 122 loads the programmed instructions stored in the memory 124, and in accordance with such programmed instructions, configures the communication interface module 126 and network interface module 128 and any other components dual-mode network interface device 86,88,90.

Thereafter, the dual mode network interface device 86,88, 90 operates in a normal mode state 144 in which user data received at the communication interface module 126 is encoded by the processor into an Ethernet frame in accordance with the Ethernet protocol and transmitted via the network interface module 128. Similarly, any Ethernet frames received at the network interface module 128 are validated to confirm that such frames adhere to the syntactic, semantic, and logical rules of the Ethernet and IP protocols and, if so, the user data is extracted from such Ethernet frames and transmitted to the processor 80,82,84 coupled to the communication interface module 126.

The network interface device 86,88,90 operates in the normal mode state 144 until the network interface device 86,88,90 receives a directive to operate in an obfuscated mode. Such directive may be received by the network interface device 86,88,90 via data transmitted from the processor 80,82,84 to which the network interface device 86,88,90, respectively, is coupled, data transmitted by a device operating on the local area network in which the dual-mode network interface device 86,88,90 is also operating, an Ethernet packet transmitted from a central source (not shown) via the wide-area network 108, a communications link separate from the wide-area network 108 with the central source (e.g., a satellite link, a secure communication link, a telephone connection, and the like), manual operation by a user of a physical switch (not shown) disposed on the network interface device 86,88,90, and the like.

In response to receiving the directive to operate in the obfuscated mode, the network interface device 86,88,90 transitions to an initialize obfuscated mode state 146. When in the initialize obfuscated mode state 146, the processor 122 of the network interface device 86,88,90 loads either from the memory 124 or the central server a scheme (described below) that is used to generate obfuscated Ethernet frames from user data or non-obfuscated Ethernet frames received via the communication interface module 126 and to generate Ethernet frames or user data from obfuscated Ethernet frames received via the network interface module 128. The processor 122 may undertake other functions necessary to operate in the obfuscated mode. After such initialization is complete, the network interface device 86,88,90 operates in the obfuscated mode state 148.

When operating in the obfuscated mode state 148, the network interface device 86,88,90 generates an obfuscated Ethernet frames from user data or Ethernet frame received via the communication interface module 126 and transmits such obfuscated Ethernet frame via the network interface module 128. In addition, when operating in the obfuscated mode state 148, the network interface device 86,88,90 decodes each obfuscated Ethernet frame received via the network interface module 128 and transmits such decoded Ethernet frame or user data via the communication interface module 126.

In some embodiments, the network interface device 86,88,90 operating in the normal mode state 144 may receive a predetermined message (e.g., as a payload of an Ethernet frame) a predetermined number of times (e.g., three, five, etc.) from another device in wide area network 108 also operating in the normal mode state 144 that indicates that both the network interface device 86,88,90 and the other device in the wide area network should transition to operate in the obfuscated mode. In response, the network interface device 86,88,90 transitions to the initialize obfuscated mode state 146 and then to the obfuscated mode state 148 as described above. Similarly, receipt by the network interface device 86,88,90 operating in the obfuscated mode state 148 from another device (not shown) in the wide area network 108 of a predetermined message (e.g., as a payload of an obfuscated Ethernet frame) a predetermined number of times causes the network interface device 86,88,90 to transition to operate in the normal mode state 144.

If the network interface device 86,88,90 receives a power off signal when operating in the normal mode state 144 or the obfuscated mode state 148, the network interface device 86,88,90 transitions to a shutdown state 149 in which the processor 124 undertakes any operations necessary to safely shutdown the components of network interface device 86,88,90 and operates in an idle mode or shuts down.

Figure 4:
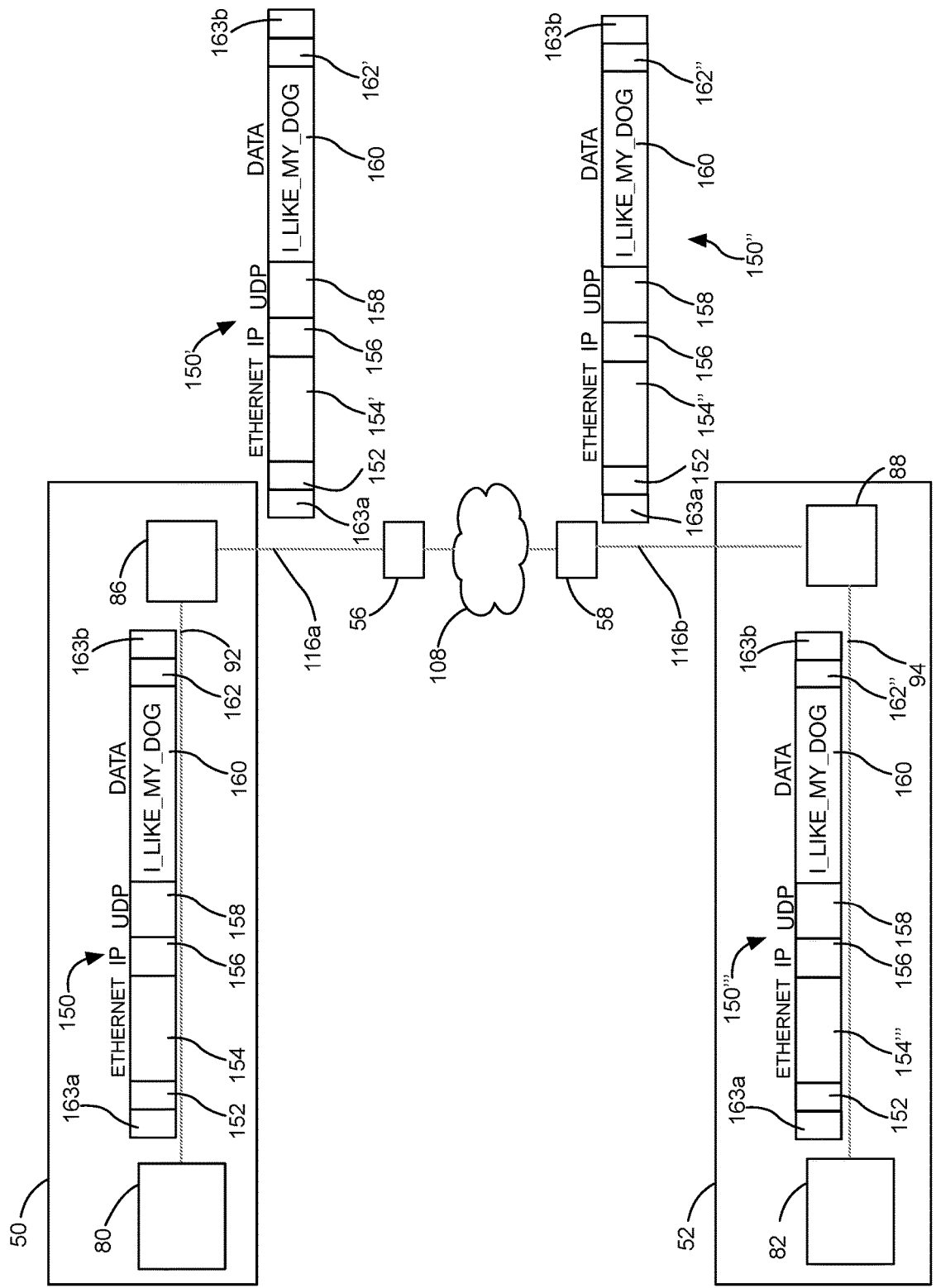
FIG. 4 illustrates transmission of Ethernet frames using the dual-mode communication devices of FIG. 1.

FIG. 4 illustrates transmission of a payload string "I_LIKE_MY_DOG" generated by an application operating on the computer 50 to an application operating on the computer 52. In this example, the network interface devices 86 and 88 and the router/modems 56 and 58 are assumed to be operating in the normal mode. Referring to FIG. 4, the processor 80 of the computer 50 creates an Ethernet frame 150 and provides such frame to the network interface device 86 via the communication link 92. As would be understood by one of ordinary skill in the art, the Ethernet frame 150 includes an Ethernet preamble and start frame delimiter portion 152 and an Ethernet header 154 that includes source and destination media access control ("MAC") addresses, ether types, and the like. Following the Ethernet header 154, if the Ethernet frame is used to transmit an IP packet, the IP packet includes an IP packet header 156 that includes a source IP address, a destination IP address, an IP port number, an IP packet checksum, and a UDP packet. The UDP packet includes a UDP packet header 158 that includes a source UDP address, a destination UDP address, and a UDP checksum. Following the UDP packet header is the data 160 (i.e., "I_LIKE_MY_DOG") to be transmitted in the Ethernet frame 150. The Ethernet frame 150 ends with a 32-bit frame check sequence (FCS) 162. The value of the FCS is determined by a cyclic redundancy code computation of the bits of the Ethernet frame 150 that precede the FCS 162. In some embodiments, the computer 50,52,54 calculates the FCS provides such FCS to the network interface device 86,88,90 and in other embodiments the computer 50,52,54 offloads calculation of the checksum to the network interface device 86,88,90. The Ethernet frame 150 when created and transmitted from the computer 50 to the computer 52 follows the syntactic, semantic, and logical rules of the publicly known Ethernet/IP protocol.

As would be apparent to one having ordinary skill in the art, the processor 80 may provide only the payload (i.e., the string "I_LIKE_MY_DOG") to the network interface device 86 and the network interface device 86 generates a valid Ethernet frame from the payload. Alternately, the processor 80 may provide a partially populated Ethernet frame, the IP packet, or only the UDP packet to the network interface device 86 and the network interface device 86 generates a valid Ethernet frame from such data provided thereto. As would be apparent to one having ordinary skill, the data the processor 80 provides the network interface device 86 to transmit a payload (i.e., the string "I_LIKE_MY_DOG") is predetermined and typically configurable.

As specified by the syntactic, semantic, and logical rules of the publicly known Ethernet/IP protocol and as would be understood by one who has ordinary skill in the art, transmission of each Ethernet frame 150 is preceded by transmission of a first predetermined sequence of bytes 163*a* that represent a first IDLE state and is followed by a second predetermined sequence of bytes 163*b* that represent a second IDLE state.

It should be apparent to one who has ordinary skill in the art that data transmitted from the processor 80,82,84 to the network interface device 86,88,90 follows the syntactic, semantic, and logical rules associated with the communication link 92,94,96, respectively. The network interface device 86,88,90 then converts and transmits such data and, if appropriate, augmented with additional data in accordance with the Ethernet protocol to the router/modem 56,58,60 if the transmission link 116*a*, 116*b*, 116*c* is Ethernet. For example, if the communication link 92,94,96 is PCIe, the processor 86,88,90 may transmit idles followed by data. The network interface device 86,88,90 will augment such data with, for example, a start of frame delimiter, an end of frame delimiter, and other Ethernet specific data to create an Ethernet frame that is sent over the transmission link 116*a*, 116*b*, 116*c*. In some embodiments, the processor 86,88,90 may calculate and transmit the frame check sequence and/or other checksums to the network interface device 86,88,90 and in other embodiments the network interface device 86,88,90 may compute such frame check sequence and/or other checksums.

The network interface device 86 receives the Ethernet frame 150 and generates an Ethernet frame 150' that is substantially identical to the Ethernet frame 150 except the Ethernet header 154 is replaced with an Ethernet header 154' that specifies a source MAC address therein to be that of the network interface device 86 and the FCS 162 replaced with an FCS 162' recalculated accordingly. The network interface device 86 forwards the Ethernet frame 150' to the router/modem 56 via the transmission link 116*a* for transmission through the wide area network 108 to the router/modem device 58. The network interface device 58 receives an Ethernet frame 150" from the router that is identical to the Ethernet frame 150' except the source MAC address in an Ethernet header 154" thereof is that of the router/modem 58 that sent such frame and the FCS 162" is one that has been recalculated by such router/modem 58. The network interface device 88 generates and transmits over the communication link 94 an Ethernet frame 150''' that is identical to the Ethernet frame 150" except such frame includes an Ethernet header 154''' having the source MAC address of the network interface device 88 and a recalculated FCS 162'''. The processor 82 extracts the payload portion 160 of the Ethernet frame 150 and provides such data portion to an application operating on the computer 54. In some embodiments, the network interface device 88 provides the Ethernet frame 150''' to the processor 82. In other embodiments, the network interface device 88 provides a portion of the Ethernet frame 150''' such as, for example, the IP packet (comprising the IP header 156, the UDP header 158, and the payload 160), the UPD packet (comprising the UDP header 158 and the payload 160), or the payload 160 encoded therein.

FIGS. 5, 5A, 5B, and 5C illustrate transmission of the data string "I_LIKE_MY_DOG" as illustrated above in FIG. 4, except with the network interface devices 86 and 88 and router/modems 56 and 58 operating in the obfuscated mode. Referring to FIGS. 5, 5A, 5B, and 5C, the processor 80 generates an Ethernet frame 150 to transmit the payload "I_LIKE_MY_DOG" to the computer 52. However, because the network interface device 86 is operating in the obfuscated mode, the communication device 86 generates an obfuscated Ethernet frame 164 as described below. In some embodiments, the communication device 86 encrypts the payload 160 prior to permutation to generate an encrypted and obfuscated the Ethernet frame 164 shown in FIG. 5. Such encryption is in addition to any encryption applied to the payload being transmitted by in the Ethernet frame. In particular, if encryption is used as part of generating the obfuscated Ethernet frame, the entire Ethernet frame is encrypted except the predetermined sequence of bytes 163*a*, 163*b* associated with IDLE states, start frame delimiters 152, and FCS 162.

The obfuscated Ethernet frame (or encrypted and obfuscated Ethernet frame) 164 is transmitted through router/modem 56, the wide-area network 108, and the router/modem 58 until the obfuscated Ethernet frame 164' is received by the communication device 88. The obfuscated Ethernet frame 164' is identical to the Ethernet frame 164 except the MAC source address in such frame is replaced with the MAC source address of the router/modem 58 and an FCS in the obfuscated Ethernet frame 164' is recalculated to reflect this change. The communication device 88 generates an Ethernet frame 150' from the obfuscated Ethernet frame/IP frame 164' that is identical to the Ethernet frame 150 except the source MAC address in the Ethernet header 154' is that of the communication device 88 and the FCS 162' is recalculated. Thereafter, the communication device 88 transmits the Ethernet frame 150' to the processor 82 of the computer 52 over the communication link 94. As noted above, the processor 80 may provide just the payload 160, a UDP packet comprising the UDP header 158 and the payload 160, the IP packet comprising the IP header 156 and the UDP packet, or another subset of the Ethernet frame 150 to the network interface device 86.

Similarly, the network interface device 88 may transmit to the processor 82 the Ethernet frame 150', just the payload 160, a UDP packet comprising the UDP header 158 and the payload 160, the IP packet comprising the IP header 156 and the UDP packet, or another subset of the Ethernet frame 150'.

To conform with the Ethernet standard, each obfuscated Ethernet frame 164,164' is preceded by and followed by first and second predetermined sequences of bytes 163*a*, 163*b* associated with first and second IDLE states.

In one embodiment, to generate the obfuscated Ethernet frame 164 from the Ethernet frame/IP 150, the network interface device 86,88 operating in the obfuscated mode updates the source MAC address in the Ethernet header 154. Thereafter, the network interface device 86,88 divides the Ethernet header 154, the IP header 156, the UDP header 158, and the data 160 into portions 154*a*-154*d*, 156*a*-156*d*, 158*a*-158*d*, and 160*a*-160*d*, respectively, as shown in FIG. 5A. The number of bytes (or bits) of each such portion need not be identical and is determined by a predetermined schema used by all the devices simultaneously operating in the obfuscated mode as described in greater detail below.

Figure 5:
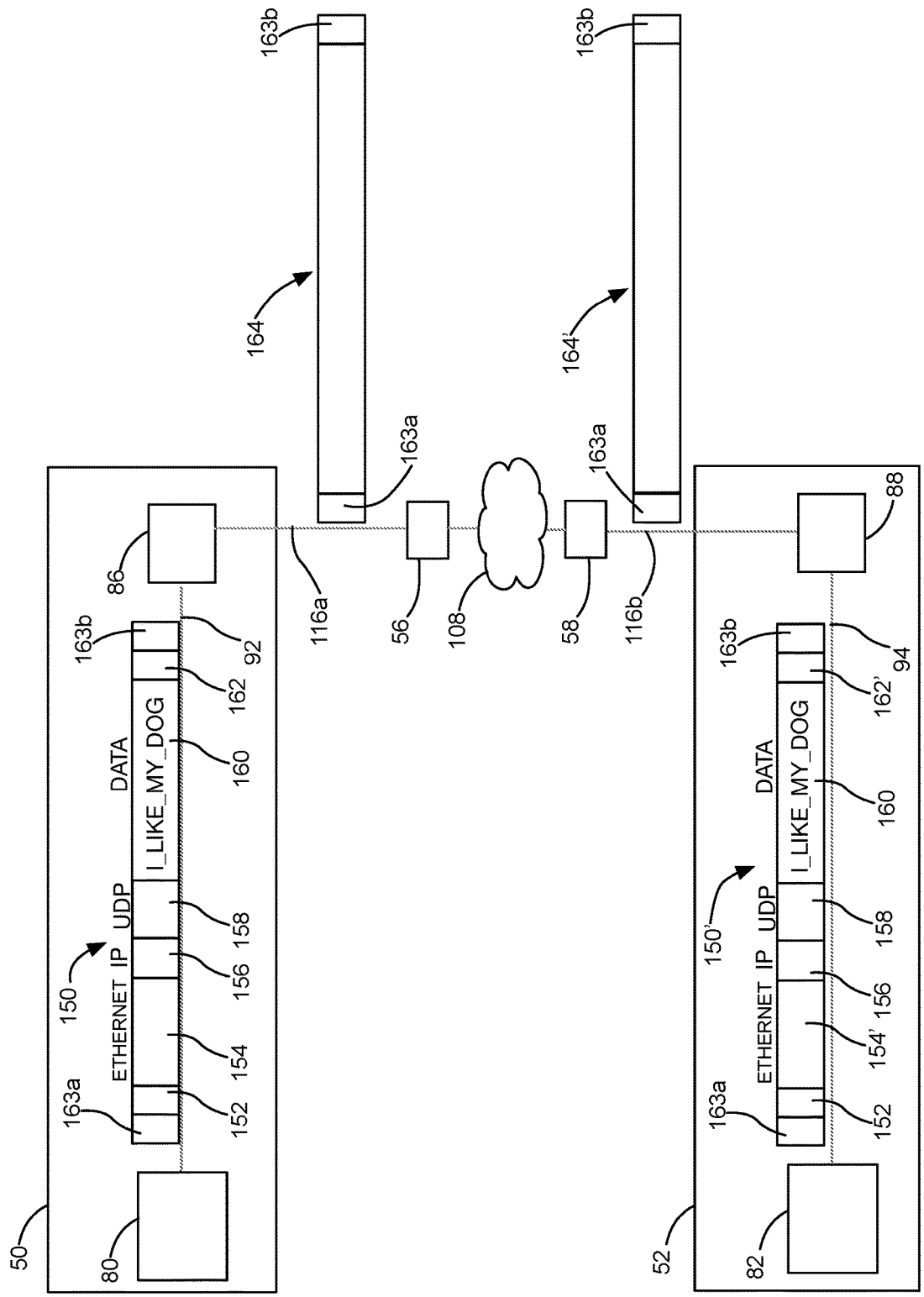
FIG. 5 illustrates transmission of obfuscated Ethernet frames using the dual-mode communication devices of FIG. 1.
Figure 5A:
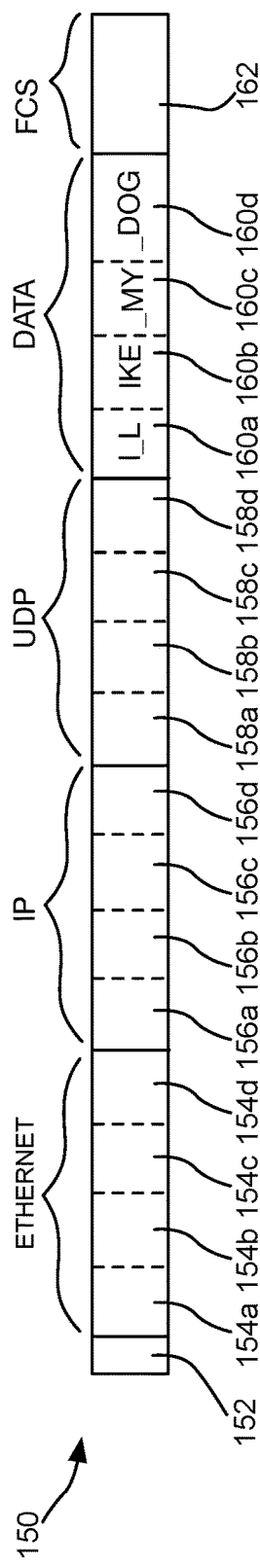
FIG. 5A is a diagram of an Ethernet frame that may be transmitted by the dual-mode communication devices of FIG. 1.
Figure 5B:
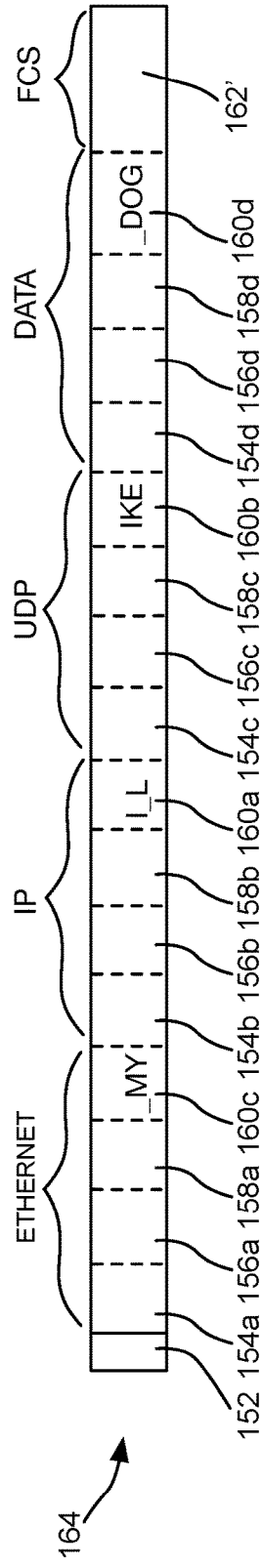
FIG. 5B is a diagram of an obfuscated Ethernet frame developed from the Ethernet frame of FIG. 5A by the dual-mode communication devices of FIG. 1.
Figure 5C:
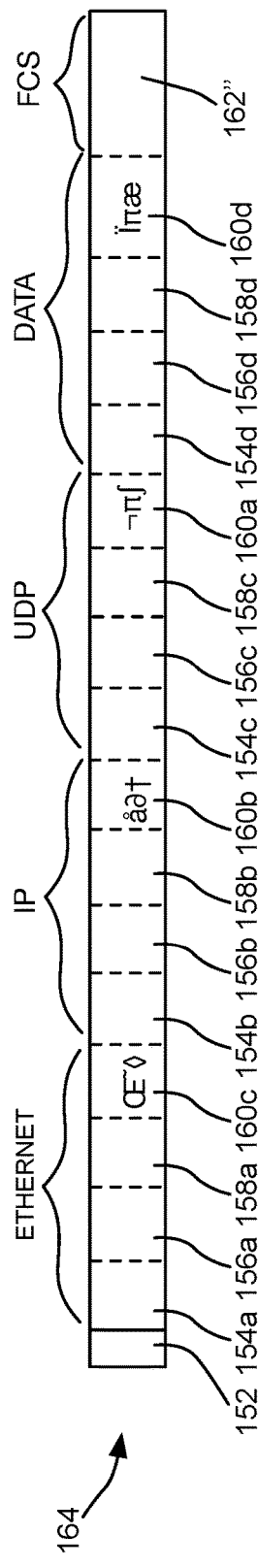
FIG. 5C is a diagram of an obfuscated and encrypted Ethernet frame developed from the Ethernet frame of FIG. 5A by the dual-mode communication devices of FIG. 1.

Thereafter, the locations of such portions within the obfuscated Ethernet frame are permuted to create a permuted (i.e., obfuscated) Ethernet frame 164 shown in FIG. 5B. Thus, for example, the locations in the Ethernet frame 164 that would normally (i.e., if not obfuscated) contain the Ethernet header 154 instead contain portions 154*a*, 156*a*, 158*a*, 160*a* of different parts of the Ethernet frame 150, locations in the Ethernet frame 164 that would normally contain the IP header 156 instead contain portions 154*b*, 162*b*, 158*b*, 160*b* of other different parts of the Ethernet frame 150, and so on. After the portions are permuted in this manner, the FCS is recalculated and stored in the portion 162.

Note that the sizes (in bytes) of the Ethernet frame 150 and the obfuscated Ethernet frame 164 are identical. Further, the boundaries of portions need not align with the boundaries of headers of the Ethernet frame.

Note that communication interface module 128 of the network interface device 86,88,90 is agnostic to whether the processor 122 generates an Ethernet 150 or an obfuscated Ethernet frame 162 and treats both types of frames identically. This is because both types of frames include valid Ethernet preambles and FCS values.

If the obfuscated Ethernet frame 164 is received by a router/modem and/or network interface device operating in the normal mode e.g., the router/modem 60 and/or network interface device 90 (FIG. 1) or obfuscated mode e.g., the router/modem 56,58 or network interface device 86,88 (FIG. 1), such router/modem 56,58,60 and/or network interface device 86,88,90 recognizes the preamble and frame start delimiters as designating a potentially valid Ethernet frame that is formed in accordance with the syntactic, semantic, and logical rules of the Ethernet/IP protocol. Thereafter, in accordance with the logical rules of such protocol, the router/modem 56,58,60 and/or network interface device 86,88,90 computes a CRC of the Ethernet frame 164 except those locations where the FCS is expected. The router modem 56,58,60 and/or network interface device 86,88,90 compares the value of the calculated CRC and the value stored in the location of the Ethernet frame 164 associated with the FCS, and determines that the received Ethernet frame 164 is valid if the two values are identical.

One of ordinary skill in the art would understand that the IP packet header 156 and the UDP packet header 158 each include packet length and checksum data that can be used to validate that these packets are formed in accordance with the syntactic, semantic, and logical rules of the IP protocol. However, because of the permutation described above, the data in locations of the obfuscated Ethernet frame 164 where such packet length and checksum data is expected will not match those encoded in the un-obfuscated Ethernet frame 150. Thus, the router/modem 60 and/or the communication device 90 operating in the normal mode determine that that the Ethernet frame 164 received thereby has been corrupted during transmission and reject (i.e., discards) the Ethernet frame 164.

Further, if the obfuscated Ethernet frame 164 is received by the router/modem 56,58 or the network interface device 86,88 operating in the obfuscated mode, the router/modem 56,58 or the network interface device 86,88 rearrange the portions of the received obfuscated Ethernet frame 164 to their expected locations before permutation to regenerate the Ethernet frame 150 from which the obfuscated Ethernet frame 164 was created.

In addition to the permutation described above, additional techniques may be used to generate an obfuscated Ethernet frame 164 from an Ethernet frame 150. For example, the data 160 encoded in the Ethernet frame 150 may be encrypted in accordance with a predetermined encryption scheme before the data 160 is divided into portions 160*a*-160*d* and permuted. Alternately, all or one or more predetermined portions of the bits of the Ethernet frame 150 may be inverted prior to permutation to generate the obfuscated packet.

It should be apparent to one who has ordinary skill in the art that although FIGS. 5 and 6 illustrate the generation and transmission of an obfuscated Ethernet frame 164 created from an Ethernet frame 150 encoded to transmit an IP packet, an obfuscated Ethernet frame 164 may be generated in a similar manner from an Ethernet frames 150 encoded to transmit non-IP packets.

In one embodiment, the scheme used to transform and Ethernet frame 150 into an obfuscated Ethernet frame 162 is time based. Referring to FIG. 6, for example, all router/modems 56,58,60 and network interface devices 86,88,90 capable of operating in the obfuscated mode are provided with a table 180 that indicates what type of obfuscation schemes should be used to generate obfuscated Ethernet frames 164 at different time intervals from a predetermined time. Such predetermined time and the table may be transmitted to all of the router/modems 56,58,60 and network interface devices 86,88,90 that are capable of operating in the obfuscated mode periodically from the central source over the wide-area network 108, a communications link separate from the wide-area network 108 with the central source (e.g., a satellite link, a secure communication link, and the like). For example, such transmission of the predetermined time and the table may occur, for example, once a day at a particular time. Alternately, such transmissions may be initiated by the central source at irregular intervals.

For example, row 182 of the table 180 indicates that starting at the predetermined time until 15 seconds past the predetermined time, no encryption should be used and the permutation scheme shown in cell 182a should be used. The permutation scheme in cell 182a instructs the router/modems 56,58,60 and network interface devices 86,88,90 to reposition bytes 512-536, 128-256, 1-32, etc. of the Ethernet frame 150 into bytes 1-25, bytes 26-154, 155-186, etc. of the obfuscated Ethernet frame 164.

Row 184 of the table 180 indicates that starting at 15 seconds after the predetermined time and until 30 seconds past the predetermined time, no encryption is to be used and specifies that bytes of the Ethernet frame 150 should be permuted in accordance with the scheme shown in cell 184a. Rows 186 and 188 indicate that 30 and 45 seconds after the predetermined time, the data portions should be encrypted using predetermined encryption keys "Key-1" and "Key-20" and the bytes should be permuted in accordance with the scheme shown in cells 186a and 188a, respectively.

To prevent an adversary from reverse engineering obfuscated frames generated by a particular network interface device 86,88,90 operating in the obfuscated mode, such communication device may generate decoy packets periodically during long idle periods between packet transmissions.

Figure 7:
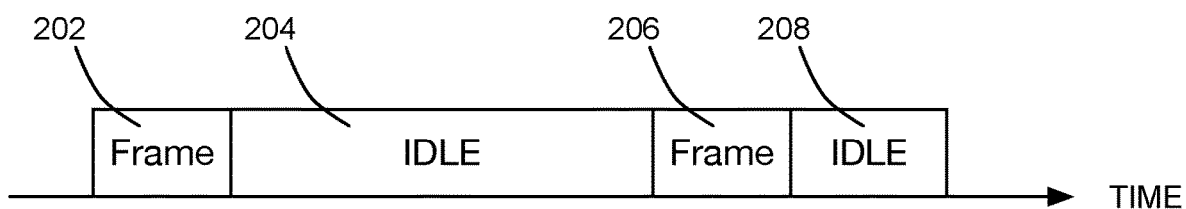
FIG. 7 is a timing diagram of a sequence of frame transmissions and idle times generated by the dual-mode communication devices of FIG. 1.
Figure 7A:
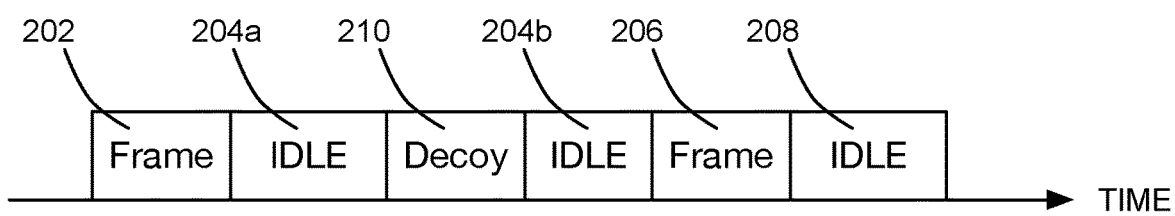
FIG. 7A is a timing diagram of a sequence of frame transmissions, decoy frame transmissions, and idle times generated by the dual-mode communication devices of FIG. 1.

For example, referring to FIG. 7, suppose network interface devices 86,88,90 is operating in the obfuscated mode and generates and transmits an obfuscated Ethernet frame 202, then after long first period of idle time 204, generates and transmits a second Ethernet frame 206, followed by another period of idle time 208. Referring, also FIG. 6A, the network interface device 86,88,90 may determine that after transmission of obfuscated Ethernet frame 202, a sufficient period of idle time 204a has elapsed without any transmission and in response generate and transmits a decoy frame 210 followed by a second period of idle time 204b. The network interface device 86,88,90 then transmits of the obfuscated Ethernet frame 206. In some embodiments, the network interface device 86,88,90 may delay transmission of the obfuscated Ethernet frame 206 to ensure that the idle time 204b is at least as long as an inter-frame time specified by the Ethernet/IP protocol. In some embodiments, the decoy frame 210 comprises a valid Ethernet preamble and FCS but the remaining bytes of the decoy frame 210 are randomly generated. Further, the randomly generated bytes are checked to confirm that such bytes cannot be interpreted as having valid IP or UDP checksum values. The randomly generated bytes are modified further to ensure that such bytes cannot be interpreted as having valid IP or UDP checksum values to ensure that a communication device will not interpret such bytes as being a valid IP or UDP packet.

Figure 8:
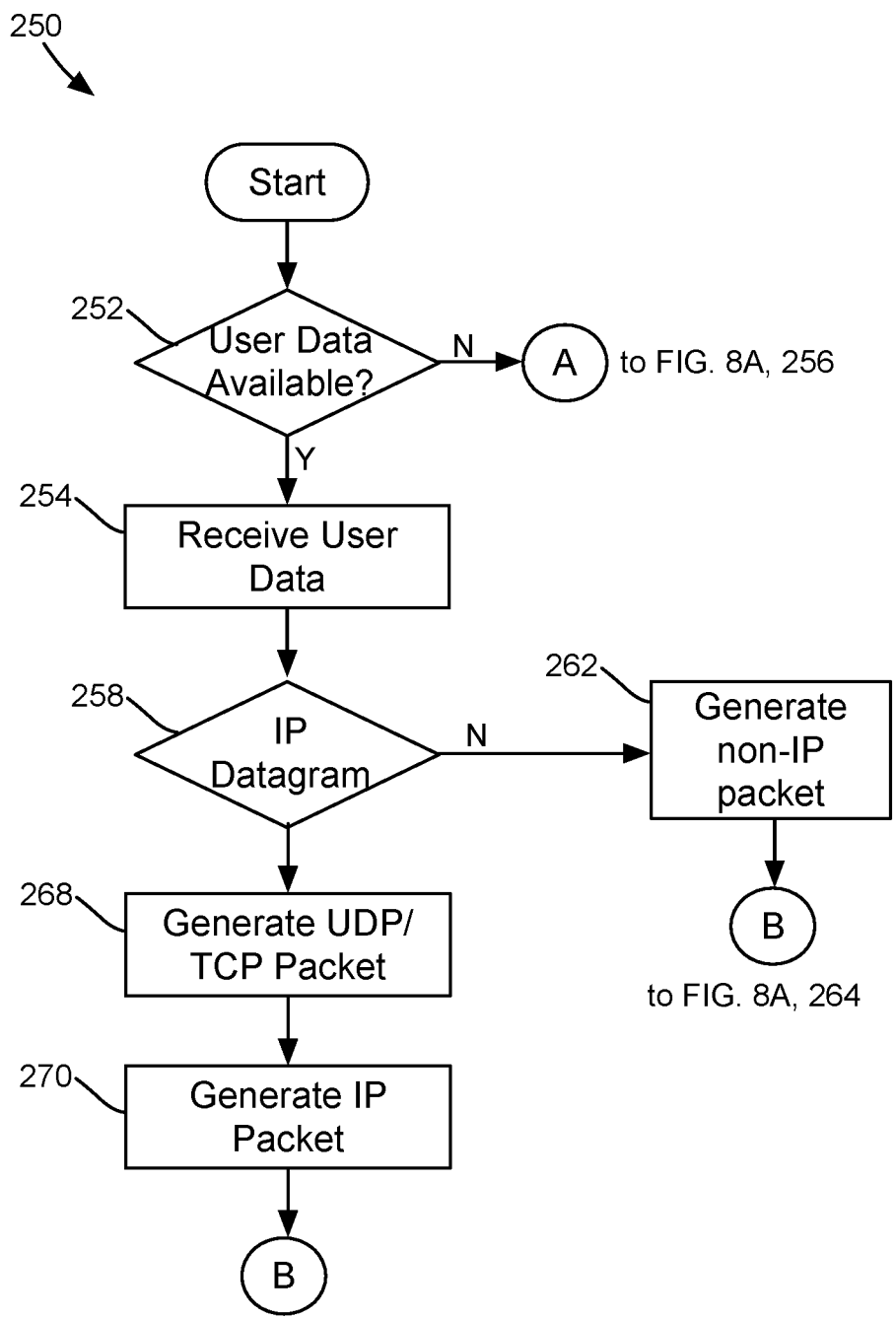
FIGS. 8 and 8A are a flowchart of steps undertaken by the dual-mode communication devices of FIG. 1 to transmit Ethernet frames.
Figure 8A:
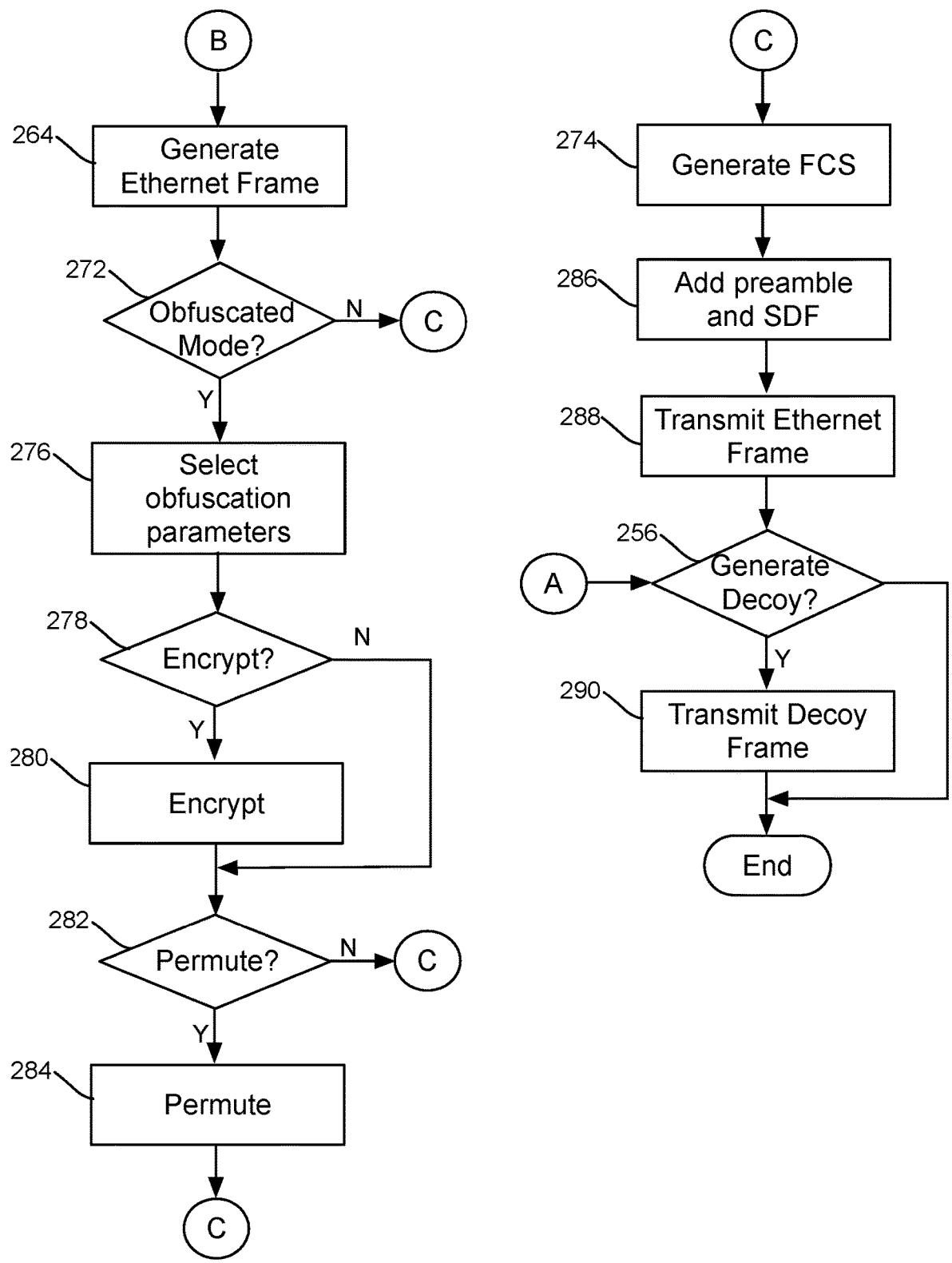

FIGS. 8 and 8A are a flowchart 250 of the processing undertaken by the network interface device 86,88,90 to encode user data generated by the computer 50,52,54, respectively, using the Ethernet/IP protocol.

Referring to FIG. 8, the network interface device 86,88,90 at step 252 checks whether any user data (e.g., a payload, a data packet, an Ethernet frame, a portion of an Ethernet frame, and the like) is available from the processor 80,82,84, respectively, for transmission. If such user data has been received the network interface device 86,88,90 proceeds to step 254, otherwise the network interface device 86,88,90 proceeds to step 256 (FIG. 8A).

At step 254 the network interface device 86,88,90 receives the user data.

At step 258, the network interface device 86,88,90 determines if the user data indicates that IP packet is to be used to transmit the user data and if so, proceeds to step 268.

Otherwise, at step 262, the network interface device 86,88,90 generates a non-IP packet (e.g., an ARP, PTP, or packet in accordance with a non-IP protocol) and proceeds to step 264.

At step 268, the network interface device 86,88,90 generates UDP/TCP packet data and creates a UDP/TCP packet that comprises such header data followed by the user data or encrypted user data as appropriate.

At step 270, the network interface device 86,88,90 generates IP header data and creates an IP packet that comprises the IP header data followed by the UDP/TCP packet and proceeds to step 264 (FIG. 8A).

At step 264, the network interface device 86,88,90 generates Ethernet header data and creates an Ethernet frame 150 that comprises the Ethernet header data followed by the IP packet and proceeds to step 272.

At step 272, the network interface device 86,88,90 checks whether the network interface device 86,88,90 is operating in the obfuscated mode. If so, the network interface device 86,88,90 proceeds to step 274, otherwise the network interface device 86,88,90 proceeds to step 276.

At step 276, the network interface device 86,88,90 determines obfuscation parameters to use to generate the obfuscated Ethernet frame, for example, by selecting the row of the table 180 associated with a current time.

At step 278, the network interface device 86,88,90 determine if obfuscation parameters indicate that the obfuscated Ethernet packet is to be encrypted. If so, the network device 86,88,90 proceeds to step 280, otherwise the network device 86,88,90 proceeds to step 282.

In some embodiments, only obfuscated Ethernet frames carrying IP packets are encrypted and, in such embodiments, at step 278 the network interface device 86,88,90 determines that the obfuscated Ethernet frame is to be encrypted only if the obfuscation parameters indicate so and an IP packet is to be used to transmit the user data as determined at step 258.

At step 280, the network interface device 86,88,90 encrypts the Ethernet frame using, the encryption scheme (e.g., AES, MACSEC, HAIPE, bit-inversion, and the like) and the key specified in the obfuscation parameters (e.g., as indicated in the table 180). Thereafter, the network interface device 86,88,90 proceeds to step 282. In particular, the encryption scheme used by the network interface device 86,88,90 may be any predetermined encryption scheme that does not alter the size (i.e., number of bytes) that comprise the Ethernet frame.

At step 282, the network interface device 86,88,90 determines if the obfuscation parameters indicate the obfuscated Ethernet frame is to be permuted. If so, the network interface device 86,88,90 proceeds to step 284, otherwise the network interface device 86,88,90 proceeds to step 274.

At step 284, the network interface device 86,88,90 permutes the Ethernet frame 150 created at step 264 or the encrypted Ethernet frame created at step 280 as described hereinabove and proceeds to step 274.

At step 274, the network interface device 86,88,90 computes a CRC of the Ethernet frame if operating in the normal mode or of the obfuscated Ethernet frame if operating in the obfuscated mode and appends the value of the CRC as the FCS to such Ethernet frame or obfuscated Ethernet frame.

At step 286, the network interface device 86,88,90 generates an Ethernet preamble and SFD for the Ethernet frame or obfuscated Ethernet frame and, at step 288, transmits the preamble, SFD, and Ethernet or obfuscated Ethernet fame over the transmission link 166a, 116b, 116c, respectively.

Note that at step 288 the network interface device 86,88, 90 confirms that a sufficient amount of idle time has elapsed since transmission of the previous Ethernet frame and generates the predetermined number of IDLE bytes necessary as specified by the Ethernet/IP protocol, before transmitting the Ethernet preamble and Ethernet frame. After step 288, the network interface device 86,88,90 proceeds to step 256.

At step 256, the network interface device 86,88,90 determines if a decoy frame should be transmitted. As noted above, such decoy frame may be transmitted if the network interface device 86,88,90 is configured to do so and at least a predetermined amount of idle time has elapsed without transmission of an Ethernet frame. Alternately, the network interface device 86,88,90 may transmit the decoy frame after transmitting a predetermined or random number of non-decoy Ethernet frames. If so, the network interface device 86,88,90 proceeds to step 290, otherwise the network interface device 86,88,90 waits for arrival of additional user data to be transmitted or an amount of predetermined amount of time to elapse to generate another decoy frame.

At step 290, the network interface device 86,88,90 generates and transmits the decoy frame. In those cases, in which the decoy frame is transmitted after a number of valid frames are transmitted, the network interface device 86,88, 90, also at step 290, waits the requisite amount of time between frames specified by the Ethernet/IP protocol before transmitting the decoy packet. After transmitting the decoy frame, the network interface device 86,88,90 waits for additional user data or for the predetermined amount of idle time to elapse.

Figure 9:
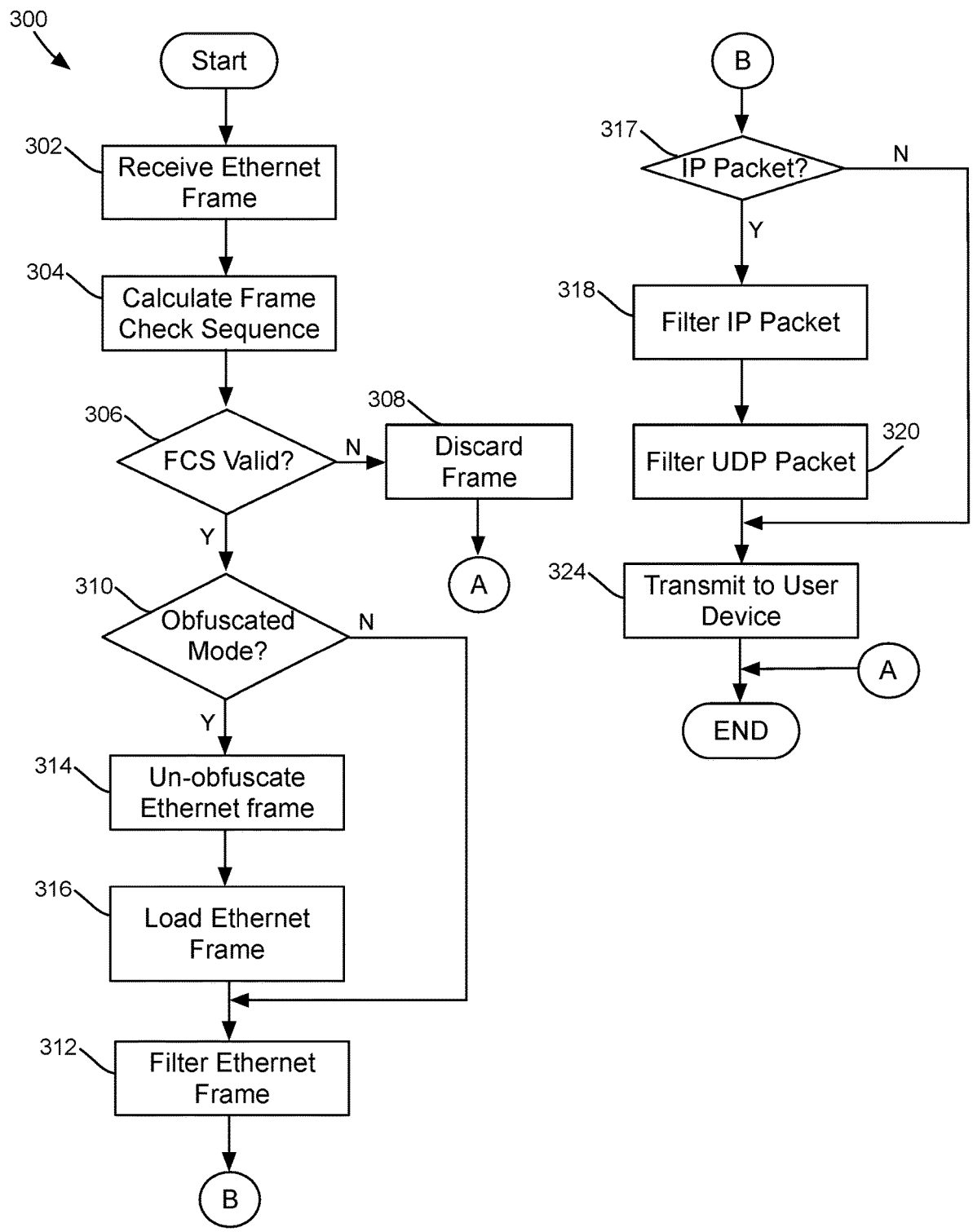
FIG. 9 is a flowchart of steps undertaken by the dual-mode communication device of FIG. 1 to receive and decode Ethernet frames.

FIG. 9 is a flowchart 300 of the processing undertaken by the network interface device 86,88,90 to decode a received Ethernet or obfuscated Ethernet frame to extract user data therefrom and transmit such user data to the computer 50,52,54, respectively.

At step 302, the network interface device 86,88,90 receives an Ethernet frame over the transmission link 116a, 116b, 116c, respectively.

As step 304, the network interface device 86,88,90 calculates a CRC of the Ethernet frame described above and at step 306 compares the value of the CRC with the value of the FCS in the Ethernet frame. If the two values are not identical, the network interface device 86,88,90, at step 308, discards the frame and waits for another packet to be received.

Otherwise, at step 310, the network interface device 86,88,90 determines if obfuscated mode is being used. If obfuscated mode is not being used, the network interface device 86,88,90 proceeds to step 312.

Otherwise, at step 314, the network interface device 86,88,90 un-obfuscates the received obfuscated Ethernet frame as described in greater detail below. At step 316, the network interface device 86,88,90 loads a de-obfuscated Ethernet frame generate and stored at step 314 and then proceeds to step 312.

At step 312, the network interface device 86,88,90 filters the Ethernet header from the received and/or de-permuted Ethernet frame to develop an IP packet (or other type packet if the received Ethernet frame is not used to transmit an IP packet). Thereafter, the network interface device 86,88,90 proceeds to step 317.

At step 317, the network interface device 86,88,90 determines if the received or de-permuted Ethernet frame is used to transmit an IP packet, and if so proceeds to step 318. Otherwise, the network interface device 86,88,90 proceeds to step 324.

At step 318, the network interface device 86,88,90 filters the IP header header from the IP packet frame and develops the UDP/TCP packet (or other type of packet/payload if the received Ethernet frame data is not being used to transmit a UDP/TCP packet).

At step 320, the network interface device 86,88,90 filters the UDP/TCP header from the UDP/TCP packet to develop the user data (payload) and proceeds to step 324.

At step 324, the network interface device 86,88,90 transmits the user data (if the Ethernet frame is used to transmit an IP packet) or, otherwise, the filtered Ethernet frame to the processor 80,82,86 over the communication link 92,94,96, respectively. Thereafter, the communication device waits for another frame to be received at the transmission link 116a, 116b, 116c.

Figure 9A:
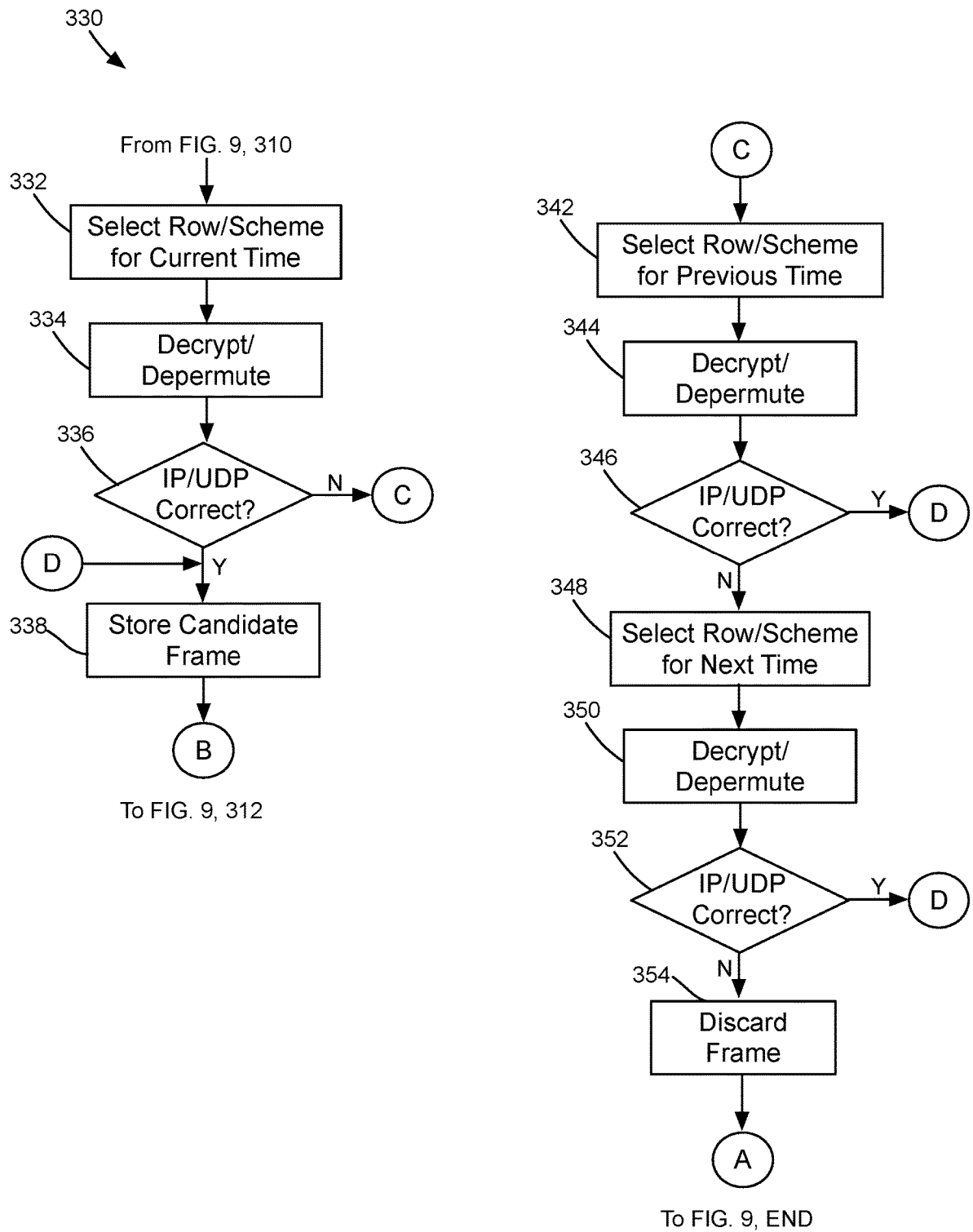
FIG. 9A is a flowchart of further steps undertaken by the dual-mode communication device of FIG. 1 to decode received Ethernet frames.

FIG. 9A shows a flowchart 330 processing undertaken by one embodiment of the network interface device 86,88,90 to de-obfuscate the Ethernet frame received at step 302.

Referring to FIGS. 6, 9, and 9A, the network interface device 86,88,90, at step 332, determines the row of the table 180 that is associated with the current time (i.e., based on the amount of time elapsed from the predetermined time transmitted by the central source as described above) and loads the obfuscation parameters associated with such time.

At step 334, the network interface device 86,88,90 decrypts and de-permutes the Ethernet frame received at step 302 (FIG. 9) in accordance obfuscation parameters determined at step 332 to create a first candidate de-permuted Ethernet frame, as described in detail below.

For example, if row 184 was selected at step 332, the network interface device 86,88,90 de-permutes the received Ethernet frame to reverse the permutation scheme specified in cell 184a of such row.

Thereafter, at step 336, the network interface device 86,88,90 checks if the Ethernet frame is being used to transmit and IP packet and if the IP checksum and packet length and the UDP checksum and packet length encoded in the first candidate de-permuted frame are valid.

If the Ethernet frame does not contain an IP packet or the IP and UDP checksums and lengths are valid, the network interface device 86,88,90, stores the first candidate un-obfuscated Ethernet frame as an un-obfuscated Ethernet frame at step 338 and proceeds to step 312 (FIG. 9).

Otherwise, at step 342, the network interface device 86,88,90 selects the row of the table 180 that is associated with a time period immediately before the time period used at step 332 and determines the obfuscation parameters associated with such row. Thus, if the network interface device 86,88,90 selected the row 184 at step 332, then the communication device selects the row 182 at step 342.

At step 344, the network interface device 86,88,90 decrypts and de-permutes the Ethernet frame received at step 302 in accordance with the obfuscation determined at step 338 to develop a second candidate de-obfuscated Ethernet frame.

Thereafter, at step 346, the network interface device 86,88,90 checks if the second candidate de-obfuscated Ethernet frame is being used to transmit an IP packet and, if so, the IP and UDP packet checksums and packet lengths encoded in the second candidate de-obfuscated Ethernet frame at step 346 are valid. If the frame is not being to transmit an IP packet or if such checksums and lengths are valid, the network interface device 86,88,90 proceeds to step 338.

Otherwise, at step 348, the network interface device 86,88,90 selects the row of the table 180 associated with a time period immediately following the time period used at step 332 and determines the obfuscation parameters associated with such row. Thus, if the row 184 was selected at step 332, the network interface device 86,88,90 now selects the row 186.

At step 350, the network interface device 86,88,90 decrypts and de-permutes the Ethernet frame received at step 302 in accordance obfuscation parameters determined at step 348 to develop a third candidate de-obfuscated Ethernet frame.

Thereafter, at step 352, the network interface device 86,88,90 checks if the third candidate de-obfuscated Ethernet frame is being used to transmit an IP packet and, if so, the IP and UDP packet checksums and packet lengths encoded in the third candidate de-obfuscated Ethernet frame are valid. If the third de-obfuscated Ethernet frame is not being used to transmit an IP packet or if such checksums and lengths are valid, the network interface device 86,88,90 proceeds to step 338.

Otherwise, at step 354, the network interface device 86,88,90 discards the Ethernet frame received at step 302 as an invalid frame and exits.

Note that if the network interface device 86,88,90 reaches step 338 as a result of the validation check at step 346, the network interface device 86,88,90 stores, at step 338, the second candidate de-permuted frame as the de-obfuscated Ethernet frame developed at step 344.

Similarly, if the network interface device 86,88,90 reaches step 338 as a result of the validation check at step 352, the network interface device 86,88,90 stores, at step 338, the third candidate de-obfuscated frame as the de-obfuscated Ethernet frame.

Further, if the Ethernet frame received at step 302 is used to transmit packet in accordance with a protocol (e.g., ARP, PTP, etc.) other than those that conform to the IP/UDP protocols, the validity checks performed at steps 336,346, and 352 are in accordance with the syntactic, semantic, and logical rules of such protocol to confirm that the data and/or packet(s) extracted from the obfuscated Ethernet frame is/are valid.

One of ordinary skill in the art will appreciate that the checking obfuscation schemes associated with a current time, a past time, and a future time to decode a received obfuscated Ethernet frame allows the receiving network interface device 86,88,90 to compensate for any difference in reference time between the receiving network interface device 86,88,90 and the device that generated the obfuscated Ethernet frame. Further, checking obfuscation schemes in this manner also allows the receiving network interface device 86,88,90 to compensate for elapsed time between when the obfuscated Ethernet frame was transmitted and when the obfuscated Ethernet frame was received by network interface device 86,88,90.

Figure 9B:
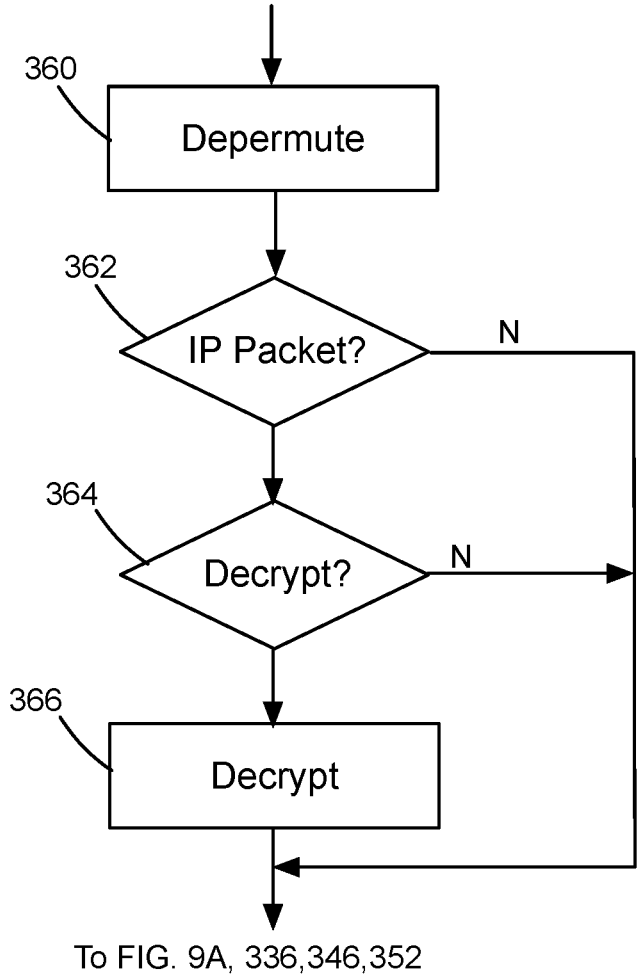
FIG. 9B is a flowchart of steps undertaken by the dual-mode communication device of FIG. 1 to de-obfuscate a received Ethernet frame.

FIG. 9B shows a flowchart of the processing undertaken at steps 334, 344, and 350 to decrypt and de-permute an obfuscated Ethernet frame in accordance with the obfuscation parameters developed at steps 332, 342, and 348, respectively.

Referring to FIG. 9B, at step 360 the network interface device 86,88,90 de-permutes the obfuscated Ethernet frame in accordance with the obfuscation parameters.

In those embodiments in which only obfuscated Ethernet frames use to transmit IP packets may be encrypted, the network interface device 86,88,90 determines if the de-permuted Ethernet frame is used to transmit an IP packet at step 362, and if so proceeds to step 364. Otherwise, the network interface device 86,88,90 proceeds to step 336, 346, or 352 (FIG. 9A) depending on whether step 360 was reached from steps 332, 342, or 348, respectively.

In some embodiments, at step 362, the network interface device 86,88,90 checks the Ethertype field of the Ethernet frame to determine if the received Ethernet frame is used to carry an IP packet. In other embodiments, the network interface device 86,88,90 checks a value of a frame length field in the Ethernet frame to determine if the Ethernet frame is used to carry an IP packet, as should be apparent to one who has ordinary skill in the art.

In those embodiments in which all obfuscated may be encrypted, the network interface device 86,88,90 does not undertake step 362 but proceeds from step 360 to step 364.

At step 364, the network interface device 86,88,90 determines using the obfuscation parameters if the obfuscated Ethernet packet was encrypted. If so, the network interface device 86,88,90 proceeds to step 366. Otherwise, the network interface device 86,88,90 proceeds to step 336, 346, or 352 depending on whether step 360 was reached from steps 332, 342, or 348, respectively.

At step 366, the network interface device 86,88,90 decrypts the obfuscated Ethernet packet and thereafter proceeds to step 336, 346, or 352 depending on whether step 360 was reached from steps 332, 342, or 348, respectively.

If the router/modem 56,58,60 is operating in the obfuscated mode and receives an obfuscated Ethernet frame to forward to another device, the router/modem 56,58,60 undertakes steps 302-316 shown in FIG. 9 to generate a de-obfuscated Ethernet frame. If the de-obfuscated Ethernet frame indicates the destination of such frame is another device operating in the wide area network 108, the router/modem replaces the source MAC address in the de-obfuscated Ethernet frame with that of the router/modem 56,58, 60, undertakes steps 276-286 shown in FIG. 8A to create a further obfuscated Ethernet frame. Thereafter, the router/modem 56,58,70 forwards the further obfuscated Ethernet frame to the device to the other device in the wide area network 108 as indicated in the de-obfuscated Ethernet frame.

Alternately, if the de-obfuscated frame indicates the destination of such frame is a device (not shown) operating in the local area network managed by the router/modem 56,58, 60 (i.e., the router/modem 56,58,60 is also operating as a network switch), the router/modem 56,58,60 simply forwards the obfuscated Ethernet frame received thereby to the destination device.

Although in the embodiments described above an obfuscated Ethernet frame is generated by applying encryption (if any) and then permutation to the Ethernet frame, it should be apparent to one of ordinary skill in the art that the obfuscated Ethernet frame may be generated by applying permutation and then encryption (if any) to the Ethernet frame.

Further, it should be apparent to one of ordinary skill in the art that the embodiments described herein used to obfuscate Ethernet frames may be used in combination with other types of secure Ethernet communication such transmission of encrypted payload data and/or communications over a virtual private network (e.g., using the IPsec communication).

The embodiments described herein may be adapted to obfuscate frames that do not use Ethernet. For example, the embodiments described above may be readily adapted for use in transmission over optical fiber links that use industry standard Synchronous Optical Network (SONET) or Optical Transmission Network (OTN) protocols to transmit IP (or other) data encoded in frames developed in accordance with a generic frame procedure (GFP) technique. The contents of the GFP frame except the GFP header may be obfuscated/encrypted and an optional GFP FCS may be calculated and appended to the GFP frame prior to transmission as described above.

Referring once again to FIGS. 1 and 2, as described above, the executable program instructions stored in the memory 124 of the network interface device 86,88,90 cause the processor 122 thereof to undertake generation and decoding of obfuscated Ethernet frames. Alternately, in some embodiments, such generation and decoding capabilities may be added to commercially available communication devices, such as off-the-shelf routers and/or switches.

In one embodiment, an upgrade kit comprising a storage media with software may be provided to upgrade the executable program instructions stored in such off-the-shelf routers to support generation and decoding of obfuscated packets. Such storage media may be a flash or other portable memory or other storage media or storage media in the wide-area network 108 (or another media) from with the upgraded executable program instructions may be downloaded and installed on a conventional communication device.

Figure 10:
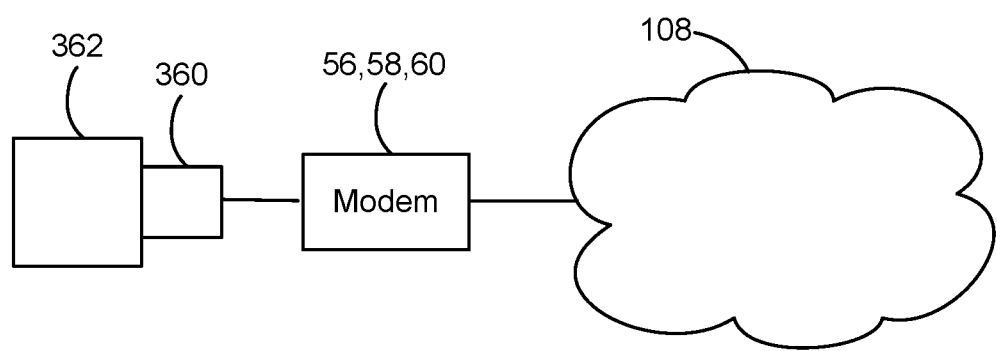
FIG. 10 shows a kit that may be used convert a conventional communication device into one of the dual-mode communication devices of FIG. 1.

Referring to FIG. 10, in another embodiment, the upgrade kit may comprise an accessory device 360, e.g., a dongle. The accessory device includes a first Ethernet, USB, or other communication port connector that may be directly coupled to an output port, e.g., an output Ethernet or other communication port, of a conventional communication device 362. The accessory device 360 also includes a second Ethernet or other communication port coupled to the router/modem 56,58,60, which in turn is coupled to the wide-area network 108.

The accessory device 360 is similar to the communication device 120 (shown in FIG. 2) and includes a processor 122, a memory 124, a communication interface module 126 and a network interface module 128. The communication interface module 126 is coupled to the first communication port of the accessory device 360 and receives any Ethernet frames transmitted by the conventional communication device 362 and provides such Ethernet frame to the processor 122. The processor generates an obfuscated Ethernet frame from the received Ethernet and causes the network interface module 128 to transmit via the second communication port of the accessory device 360 such obfuscated Ethernet frame to the router/modem 110 and the wide-area network 108.

Similarly, the second network interface module 128 intercepts obfuscated Ethernet frame sent by the router/modem 110 to the conventional communication device 362, provides the obfuscated Ethernet frame to the processor 122 for de-permutation, and the processor 122 provides the de-permuted Ethernet frame to the communication interface module 126 to transmit to the conventional communication device 362. In some embodiments, the conventional communication device 360 may be device as an Internet capable camera, a non-computer device, and the like. Further, the router/modem 110 is identical to the router/modems 56,58,70 described above and is capable of operating in the normal mode and the obfuscated mode.

Those of ordinary skill in the art would understand that because the Ethernet frames and the obfuscated Ethernet frames generated therefrom are identical in length, throughput of transmission is unaffected. Further, because Ethernet idle times, start and end of frame delimiters, preambles are still honored when an obfuscated Ethernet frames are transmitted and because the obfuscated Ethernet frames have valid FCSs, the obfuscated Ethernet frames are backwardly compatible with conventional (i.e., legacy) communication devices.

It should be apparent to those who have ordinary skill in the art will appreciate that random attacks on devices operating in the obfuscated mode is significantly reduced because the probability of an attacking Ethernet frame mimicking an obfuscated Ethernet frame having FCS, IP length, UDP length, and other values after de-permuting that pass logical checks is relatively low.

One of ordinary skill in the art will understand that the embodiments described above to obfuscate Ethernet frames used to transmit IP and/or UDP packet may be adapted to obfuscate Ethernet frames used to transmit other types of data such as, for example, data in accordance with the Address Resolution Protocol (ARP) defined in RFC 826, Precision Time Protocol defined in RFC 8173, and the like.

Although the embodiments described above are in the context of Ethernet/IP communications, those of ordinary skill in the art will understand that these embodiments may be adapted to secure data transmission that use other types of protocols, such as, for example, inter-bank communications, cellular network communications, and the like.

It should be apparent to those who have skill in the art that any combination of hardware and/or software may be used to implement components of the dual-mode router/modems 56,58,60 and/or network interface device 86,88,90 described herein. It will be understood and appreciated that one or more of the processes, sub-processes, and process steps described in connection with FIGS. 1-1—may be performed by hardware, software, or a combination of hardware and software on one or more electronic or digitally-controlled devices. The software may reside in a software memory in a suitable electronic processing component or system such as, for example, one or more of the functional systems, controllers, devices, components, modules, or sub-modules depicted in FIGS. 1-10. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the router/modems 56,58,60, network interface devices 86,88,90 and/or accessory 360), which includes, for example, one or more microprocessors, general purpose processors, combinations of processors, digital signal processors (DSPs), field programmable gate arrays (FPGAs), application-specific integrated circuits (ASICs), and/or graphics processing units (GPUs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

Depending on certain implementation requirements, the embodiments described can be implemented in hardware and/or in software. The implementation can be performed using a non-transitory storage medium such as a digital storage medium, for example, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according comprise a data carrier having electronically readable control signals, which are capable of cooperating with a processor, a controller, or a programmable computer system, such that one of the methods described herein is performed.

Generally, embodiments disclosed herein can be implemented as a computer program product with a program code, the program code being operative for performing one of the methods when the computer program product runs on a computer. The program code may, for example, be stored on a machine-readable carrier.

Other embodiments comprise the computer program for performing one of the methods described herein, stored on a machine-readable carrier.

In other words, an embodiment, therefore, may include a computer program having a program code for performing one of the methods described herein, when the computer program runs on a processor, a controller, and/or a computer.

A further embodiment of the system described herein is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitory. A further embodiment of the present invention is an apparatus as described herein comprising a processor and the storage medium.

A further embodiment of the system describe herein is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While particular embodiments of the present invention have been illustrated and described, it would be apparent to those skilled in the art that various other changes and modifications can be made and are intended to fall within the spirit and scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A dual-mode communication device adapted for communication over a public network, wherein the dual-mode communication device is adapted to be operated in a normal mode and in an obfuscated mode, the dual mode-communication device comprising:
   a programmed device comprising a processor and a memory, the memory having programming instruction stored therein that when executed by the processor cause the processor to:
      develop a frame from a payload received by the dual-communication device and, if the dual-mode communication device is operating in the obfuscated mode, an obfuscated frame from the frame, wherein the frame and the obfuscated frame comprise a preamble that conforms with protocols associated with the public network and the processor; and transmit one of the frame or the obfuscated frame using the public network;

wherein the payload may be extracted from the frame by any receiving device operating in the normal mode in the public network and the payload may be extracted from the obfuscated frame only by another communication device also operating in the obfuscated mode in the public network.

2. The dual-mode communication device of claim 1, wherein if the dual-mode communication device is operating in the obfuscated mode, the processor permutes at least a first location in the frame of at least one of a portion of the header and a portion of the payload from one specified by the protocols to a second location to create the obfuscated frame.

3. The dual-mode communication device of claim 2, wherein the protocols specify a third location in the frame for a frame sequence checksum, and the processor calculates a value of the frame sequence checksum of the obfuscated frame in accordance with the protocols and stores the value in the third location.

4. The dual-mode communication device of claim 2, wherein selection of the second location is time dependent.

5. The dual-mode communication device of claim 2, wherein the processor encrypts at least a portion of the payload if the dual-mode communication device is operating in the obfuscated mode.

6. The dual-mode communication device of claim 1, wherein receipt of a signal causes the dual-mode communication device to transition from operating in the normal mode to operate in the obfuscated mode.

7. The dual-mode communication device of claim 6, wherein receipt of a further signal causes the dual-mode communication device to transition from operating in the obfuscated to operate in the normal mode.

8. The dual-mode communication device of claim 1, wherein the frame conforms to the Ethernet protocol.

9. The dual-mode communication device of claim 8, wherein the payload is encoded in accordance with the IP protocol.

10. The dual-mode communication device of claim 1, wherein the dual-mode communication device is a network adapter card or a router.

11. A dual-mode communication device adapted for communication over a public network, wherein the dual-mode communication device is adapted to be operated in a normal mode and in an obfuscated mode, the dual mode-communication device comprising:

a programmed device having a processor and a memory having programming instructions stored therein that when executed by the processor cause the processor to:

receive a frame from the public network wherein the frame comprises a preamble and a frame check sequence that conform with protocols associated with the public network; and develop a payload from the frame without de-permuting the frame if the dual-mode communication device is operating normal mode and the processor de-permutes the frame to develop the payload if the dual-mode communication device is operating in the obfuscated mode.

12. The dual-mode communication device of claim 11, wherein the frame comprises a first frame and the processor de-permutes the frame in accordance with a time to develop a second frame.

13. The dual-mode communication device of claim 12, wherein the time comprises a first time and the processor determines that the second frame is not valid in accordance with the protocols and de-permutes the frame in accordance with a second time.

14. The dual-mode communication device of claim 12, wherein the first time and the second time are first and second elapsed times from a predetermined time.

15. The dual-mode communication device of claim 12, wherein the processor directs a further network interface to transmit the payload.

16. The dual-mode communication device of claim 11, wherein the dual-mode communication device transitions from operating in the normal mode to operating in the obfuscated mode in response to receiving a signal.

17. The dual-mode communication device of claim 11, wherein the obfuscated frame comprises a valid preamble and frame check sequence in accordance with the Ethernet protocol.

18. The dual-mode communication device of claim 11, wherein the public network is the Internet.

19. A method of operating a dual-mode communication device operable in a normal mode and an obfuscated mode for communication over a public network, comprising the steps of:

operating a programmed device comprising a processor and a memory having programming instructions stored therein that when executed by the processor cause the computing device to undertake the steps of:

receiving a payload to be transmitted over the public network;

developing a frame from the payload and if the dual-mode if the dual-mode communication device is operating in an obfuscated mode, developing an obfuscated frame from the frame, wherein the frame and the obfuscated frame comprise a preamble that conforms with protocols associated with the public network and the processor; and directing a network interface to transmit one of the frame or the obfuscated frame using the public network;

wherein the payload may be extracted from the frame by any receiving device operating in a normal mode in the public network and the payload may be extracted from the obfuscated frame only by another communication device also operating in an obfuscated mode in the public network.

20. The method of claim 19, wherein the payload comprises a first payload and the frame comprises a first frame, comprising the further steps of:

receiving a second frame from the public network wherein the second frame comprises a preamble and a frame check sequence that conform with the protocols; and developing a second payload from the second frame without de-permuting the second frame if the dual-mode communication device is operating in a normal mode and de-permuting the second frame to develop the second payload if the dual-mode communication device is operating in the obfuscated mode.

21. The method of claim 20, including the further step of de-encrypting the second payload prior to transmitting the payload to a user device if the dual-mode communication device is operating in the obfuscated mode.

* * * * *